US006931543B1

(12) United States Patent
Pang et al.

(10) Patent No.: US 6,931,543 B1
(45) Date of Patent: Aug. 16, 2005

(54) PROGRAMMABLE LOGIC DEVICE WITH DECRYPTION ALGORITHM AND DECRYPTION KEY

(75) Inventors: Raymond C. Pang, San Jose, CA (US); Walter N. Sze, Saratoga, CA (US); Jennifer Wong, Fremont, CA (US); Stephen M. Trimberger, San Jose, CA (US); John M. Thendean, Berkely, CA (US); Kameswara K. Rao, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 922 days.

(21) Appl. No.: 09/724,652

(22) Filed: Nov. 28, 2000

(51) Int. Cl.[7] .............................................. G06F 17/00
(52) U.S. Cl. ....................... 713/193; 713/1; 713/100
(58) Field of Search ............................... 713/189–202, 713/1–2, 100, 150; 707/200–206

(56) References Cited

U.S. PATENT DOCUMENTS

| 5,081,675 | A | 1/1992 | Kittirutsunetorn |
| 5,121,359 | A | 6/1992 | Steele |
| 5,321,704 | A | 6/1994 | Erickson |
| 5,341,034 | A | 8/1994 | Matthews |
| 5,388,157 | A | 2/1995 | Austin |
| 5,615,263 | A | 3/1997 | Takahashi |
| 5,705,938 | A | 1/1998 | Kean |
| 5,764,076 | A | 6/1998 | Lee et al. |
| 5,838,901 | A | 11/1998 | Curd et al. |
| 5,892,961 | A | 4/1999 | Trimberger |
| 5,914,616 | A | 6/1999 | Young et al. |
| 5,931,959 | A | 8/1999 | Kwiat |
| 5,970,142 | A | 10/1999 | Erickson |
| 6,028,939 | A | 2/2000 | Yin |
| 6,118,869 | A | 9/2000 | Kelem et al. |
| 6,172,520 | B1 | 1/2001 | Lawman et al. |
| 6,212,639 | B1 | 4/2001 | Erickson et al. |
| 6,246,768 | B1 | 6/2001 | Kim |
| 6,323,679 | B1 | 11/2001 | Robertson et al. |
| 6,326,806 | B1 | 12/2001 | Fallside et al. |
| 6,366,117 | B1 | 4/2002 | Pang et al. |
| 6,441,641 | B1 | 8/2002 | Pang et al. |
| 6,480,954 | B2 | 11/2002 | Trimberger et al. |

(Continued)

FOREIGN PATENT DOCUMENTS

WO    WO 00/49717    8/2000

OTHER PUBLICATIONS http://www.arm.com/support/downloads/info/4804.html.*

(Continued)

*Primary Examiner*—David Jung
(74) *Attorney, Agent, or Firm*—Edel M. Young; LeRoy D. Maunu; Lois D. Cartier

(57) ABSTRACT

To prevent copying of a design implemented in a programmable logic device (PLD), the PLD itself stores a decryption key or keys loaded by the designer, and includes a decryptor for decrypting an encrypted configuration bitstream as it is loaded into the PLD. The PLD also includes logic for reading header information that indicates whether the bitstream is encrypted, and can accept both encrypted and unencrypted bitstreams. The encryption keys may be stored in non-volatile memory or backed up with a battery so that they are retained when power is removed.

27 Claims, 16 Drawing Sheets

U.S. PATENT DOCUMENTS

| | | |
|---|---|---|
| 6,560,709 B1 | 5/2003 | Galovich |
| 6,654,889 B1 | 11/2003 | Trimberger |
| 6,664,807 B1 | 12/2003 | Crotty et al. |
| 2001/0015919 A1 | 8/2001 | Kean |
| 2001/0032318 A1 | 10/2001 | Yip et al. |

OTHER PUBLICATIONS http://investor.xilinx.com/phoenix.zhtml?c=75919&p=irol-newsArticle&t=Regular&id=52147&.*

Evaluating the effects of SEUs affecting the configuration memory of an SRAM-based FPGA, Bellato, M. et al. Design, Automation and Test in Europe Conference and Exhibition, 2004. Proceedings, vol.: 1, Feb. 16-20, 2004 pp.: 584-589 vol. 1.*

Configurable memory organisation for communication applications Sioninen, J.-P.; Pelkonen, A.; Roivainen, J.; Digital System Design, 2002. Proceedings. Euromicro Symposium on, Sept. 4-6, 2002.*

An SRAM-programmable field-configurable memory NGai, T.; Rose, J.; Wilton, S.J.E.; Custom Integrated Circuits Conference, 1995, Proceedings of the IEEE 1995, May 1-4, 1995.*

Xilinx Application Note, "Configuration Issues: Power-Up, Volatility, Security, Battery Back-Up", XAPP 092, Nov. 24, 1997 (Version 1.1).

Virtex Configuration Guide, published by Xilinx, Inc., 2100 Logic Drive, San Jose, CA 95124, Oct. 9, 2000 (Version 1.0).

Bruce Schneier "Applied Cryptography: Protocols, Algorithms, and Source Code in C", Second Edition, Copyright 1996, published by John Wiley & Sons, Inc.; Chapter 9, pp. 193-194 and 200-203; Chapter 12, pp. 265-301 and Chapter 15, pp. 360-361.

Cahners EDN Access Web Page, "Cunning circuits confound crooks," Oct. 12, 2000; pp. 1-8; http://www.ednmag.com/ednmag/reg/2000/10122000/21df2.htm.

Xilinx, Application Note, XAPP138, "Virtex FPGA Series Configuration and Readback", published Oct. 4, 2000, available from Xilinx, Inc., 2100 Logic Drive, San Jose, California 95124.

U.S. Appl. No. 09/724,865, filed Nov. 28, 2000, Trimberger et al.

U.S. Appl. No. 09/724,974, filed Nov. 28, 2000, Trimberger et al.

U.S. Appl. No. 09/724,975, filed Nov. 28, 2000, Pang et al.

U.S. Appl. No. 09/724,873, filed Nov. 28, 2000, Pang et al.

U.S. Appl. No. 09/724,734, filed Nov. 28, 2000, Trimberger et al.

U.S. Appl. No. 09/724,972, filed Nov. 28, 2000, Trimberger et al.

Arm; "Versatile FPGA and PLD configuration images", update Sep. 13, 2004, p. 1 of 1, available at http://www.arm.com/support/downloads/info/4804.html.

Xilinx, Inc., News Release, sep. 20, 1999, pp 1-2, available from Xilinx, Inc., 2100 Logic Drive, San Jose, CA 95124 or; http://investor.xilinx.com/phoenix.zhtml?c=75919&p=irol-newsArticle&t=Regular&id=5214 . . .

* cited by examiner

| Header A |
|---|
| Data A |
| Header B |
| Data 1B |
| Data 2B |
| Data 3B |
| Data 4B |
| Header C |
| Data 1C |
| ⋮ |

Fig. 2a
PRIOR ART

| Bitstream header Config. Logic Reg. address | Config. Logic Register data contents |
|---|---|
| 0000 | Cyclic Redundancy Check (CRC) |
| 0001 | Frame Address |
| 0010 | Frame Data Input |
| 0011 | Frame Data Output |
| 0100 | Command |
| 0110 | Control |
| 0111 | Status |
| 1000 | Daisy Chain Output |
| 1001 | Configuration Option |
| 1010 | Reserved |
| 1011 | Frame Length |
| 1100 | Reserved |
| 1101 | Reserved |
| 1110 | Reserved |
| 1111 | Reserved |

Fig. 2d
PRIOR ART 32-bit Command Header Format 1

| Format Type | Op code | Config. Logic Register address | Word count |
|---|---|---|---|
| 0 0 1 | 0 0 0 1 1 0 | | |

11 bits, counts 2048 words

Fig. 2b PRIOR ART 32-bit Command Header Format 1

| Format Type | Op code | Config. Logic Register Address | Word Count |
|---|---|---|---|
| 0 0 1 | 0 0 0 1 1 0 | | 0 0 0 0 0 0 0 0 0 0 0 |

32-bit Command Header Format 2

| Format Type | Op code | Word Count |
|---|---|---|
| 0 1 0 | 0 0 0 1 1 0 | |

27 bits, counts 2.68 million words or 10 megabytes

| Header A |
|---|
| Data A |
| Header B |
| Data B |
| Header C |
| Data C |
| Header D |
| Data 1D |
| Data 2D |
| Data 3D |
| ⋮ |

Fig. 4d

| Bitstream header Config. Logic Reg. address | Config. Logic Register data contents |
|---|---|
| 0000 | Cyclic Redundancy Check (CRC) |
| 0001 | Frame Address |
| 0010 | Frame Data Input |
| 0011 | Frame Data Output |
| 0100 | Command |
| 0110 | Control |
| 0111 | Status |
| 1000 | Daisy Chain Output |
| 1001 | Configuration Option |
| 1010 | Reserved |
| 1011 | Frame Length |
| 1100 | Cipher block chaining(CBC) starter |
| 1101 | Initial key address |
| 1110 | Reserved |
| 1111 | Reserved |

32-bit Command Header Format 1

| Format Type | Op code | Config. Logic Register address | Word count |
|---|---|---|---|
| 0 0 1 | 0 0 / 0 1 / 1 0 / 1 1 | | |

Fig. 4b — 11 bits, counts 2048 words 32-bit Command Header Format 1

| Format Type | Op code | Config. Logic Register Address | Word Count |
|---|---|---|---|
| 0 0 1 | 0 0 / 0 1 / 1 0 / 1 1 | | 0 0 0 0 0 0 0 0 0 0 |

32-bit Command Header Format 2

| Format Type | Op code | Word Count |
|---|---|---|
| 0 1 0 | 0 0 / 0 1 / 1 0 / 1 1 | |

Fig. 4c — 27 bits, counts 2.68 million words or 10 megabytes

```
                                UNENCRYPTED VERSION
                                 Dummy word  11111111111111111111111111111111
                                  Sync word  10101010100110010101010101100110
        Type 1 write 1 words to CMD          00110000000000010000000000000001
                                RCRC command 00000000000000000000000000000111
        Type 1 write 1 words to FLR          00110000000000010110000000000001
                                data word 0  00000000000000000000000000011001
        Type 1 write 1 words to COR          00110000000000010010000000000001
                                data word 0  00000000000000100001111111000001
        Type 1 write 1 words to ID           00110000000000011100000000000001
                                data word 0  00000001000000001000000010010011
        Type 1 write 1 words to MASK         00110000000000011000000000000001
                                data word 0  00000000000000000000000000000000
        Type 1 write 1 words to CMD          00110000000000010000000000000001
                              SWITCH command 00000000000000000000000000001001
        Type 1 write 1 words to FAR          00110000000000000010000000000001
                                data word 0  00000000000000000000000000000000
        Type 1 write 1 words to CMD          00110000000000010000000000000001
                                WCFG command 00000000000000000000000000000001
        Type 1 write 0 words to FDRI         00110000000000000100000000000000
    Type 2 write 10530 words to FDRI         01010000000000000010100100100010
                                data word 0  00000000000000000000000000000000
                                data word 1  00000000000000000000000000000000
                                data word 2  00010000000000000000000000000000
                                data word 3  00010000000000111111111111111100
                                                       .
                                                       .
                                                       .

data word 10526  00000000000000000000000000000000
                            data word 10527  00000000010000000000000000000001
                            data word 10528  00000000000000000000000000000000
                            data word 10529  00000000000000000000000000000000
                              Auto CRC word  00000000000000000110111000010001
        Type 1 write 1 words to CMD          00110000000000010000000000000001
                                LFRM command 00000000000000000000000000000011
                                Type 1 NO OP 00100000000000000000000000000000
                                                       .
                                                       .
                                                       .

Type 1 NO OP 00100000000000000000000000000000
        Type 1 write 1 words to COR          00110000000000010010000000000001
                                data word 0  00000001000010000001111111000001
        Type 1 write 1 words to CMD          00110000000000010000000000000001
                               START command 00000000000000000000000000000101
        Type 1 write 1 words to CTL          00110000000000001010000000000001
                                data word 0  00000000000000000000000000000000
        Type 1 write 1 words to CMD          00110000000000010000000000000001
                            GRESTORE command 00000000000000000000000000001010
        Type 1 write 1 words to CRC          00110000000000000000000000000001
                                data word 0  00000000000000000101001001110010
        Type 1 write 1 words to CMD          00110000000000010000000000000001
                             DESYNCH command 00000000000000000000000000001101
                                Type 1 NO OP 00100000000000000000000000000000
```

Fig. 5a

ENCRYPTED VERSION

```
                      Dummy word 11111111111111111111111111111111
                       Sync word 10101010100110010101010101100110
    Type 1 write 1 words to CMD  00110000000000001000000000000001
                    RCRC command 00000000000000000000000000000111
    Type 1 write 1 words to FLR  00110000000000101100000000000001
                     data word 0 00000000000000000000000000011001
    Type 1 write 1 words to COR  00110000000000010010000000000001
                     data word 0 00000000000001000011111111000001
    Type 1 write 1 words to ID   00110000000000111000000000000001
                     data word 0 00000001000000001000000010010011
    Type 1 write 1 words to MASK 00110000000000011000000000000001
                     data word 0 00000000000000000000000000000000
    Type 1 write 1 words to CMD  00110000000000001000000000000001
                  SWITCH command 00000000000000000000000000001001
    Type 1 write 1 words to FAR  00110000000000000010000000000001
                     data word 0 00000000000000000000000000000000
    Type 1 write 1 words to CMD  00110000000000001000000000000001
                    WCFG command 00000000000000000000000000000001
Type 1 write 1 word to KEY ADDR  00110000000000011000000000000001
                     data word 0 00000000000000000000000000000000
Type 1 write 2 words to CBC      00110000000000011010000000000010
                     data word 0 10010000101010111100110111101111
                     data word 1 00010010001101000101011001111000
Type 1 decrypt   0 words to FDRI 00111000000000000100000000000000
Type 2 dec   10530 words to FDRI 01011000000000000101001001000010
                     data word 0 00010101110110110011001011001000
                     data word 1 11100000111000110111111101100111
                     data word 2 10101010011111011110001100110011
                     data word 3 01100001101011100010110101101100
                                                .
                                                .
                                                .
                 data word 10526 01011001101111101100010101001010
                 data word 10527 00101001010111111101011110110000
                 data word 10528 11000000010101001100110001010100
                 data word 10529 01111111100100000011000110000010
                   Auto CRC word 00000000000000001011111011001010
    Type 1 write 1 words to CMD  00110000000000001000000000000001
                    LFRM command 00000000000000000000000000000011
                    Type 1 NO OP 00100000000000000000000000000000
                                                .
                                                .
                                                .
                    Type 1 NO OP 00100000000000000000000000000000
    Type 1 write 1 words to COR  00110000000000010010000000000001
                     data word 0 00000000000001000011111111000001
    Type 1 write 1 words to CMD  00110000000000001000000000000001
                   START command 00000000000000000000000000000101
    Type 1 write 1 words to CTL  00110000000000001010000000000001
                     data word 0 00000000000000000000000000000000
    Type 1 write 1 words to CMD  00110000000000001000000000000001
                GRESTORE command 00000000000000000000000000001010
    Type 1 write 1 words to CRC  00110000000000000000000000000001
                     data word 0 00000000000000000001010111001111
    Type 1 write 1 words to CMD  00110000000000001000000000000001
                 DESYNCH command 00000000000000000000000000001101
                    Type 1 NO OP 00100000000000000000000000000000
```

Fig. 5b

PROGRAMMABLE LOGIC DEVICE WITH DECRYPTION ALGORITHM AND DECRYPTION KEY

FIELD OF THE INVENTION

The invention relates to PLDs, more particularly to protection of designs loaded into a PLD through a bitstream.

BACKGROUND OF THE INVENTION

A PLD (programmable logic device) is an integrated circuit structure that performs digital logic functions selected by a designer. PLDs include logic blocks and interconnect lines and typically both the logic blocks and interconnections are programmable. One common type of PLD is an FPGA (field programmable logic device), in which the logic blocks typically include lookup tables and flip flops, and can typically generate and store any function of their input signals. Another type is the CPLD (complex programmable logic device) in which the logic blocks perform the AND function and the OR function and the selection of input signals is programmable.

Problem with Storing Bitstream External to PLD

Designs implemented in PLDs have become complex, and it often takes months to complete and debug a design to be implemented in a PLD. When the design is going into a system of which the PLD is a part and is to be sold for profit, the designer does not want the result of this design effort to be copied by someone else. The designer often wants to keep the design a trade secret. Many PLDs, particularly FPGAs, use volatile configuration memory that must be loaded from an external device such as a PROM every time the PLD is powered up. Since configuration data is stored external to the PLD and must be transmitted through a configuration access port, the privacy of the design can easily be violated by an attacker who monitors the data on the configuration access port, e.g. by putting probes on board traces.

Current Solutions and their Disadvantages

Efforts have been made to encrypt designs, but it is difficult to make the design both secure from attackers and easy to use by legitimate users. The encryption algorithm is not a problem. Several encryption algorithms, for example, the standard Data Encryption Standard (DES) and the more secure Advanced Encryption Standard (AES) algorithm, are known for encrypting blocks of data. The process of cipher block chaining (CBC), in which an unencrypted data word is XORed with the next encrypted data word before decryption allows the DES or AES to encrypt a serial stream of data and these are therefore appropriate for encrypting a bitstream for configuring a PLD. A key used for encrypting the design must somehow be communicated in a secure way between the PLD and the structure that decrypts the design, so the design can be decrypted by the PLD before being used to configure the PLD. Then, once the PLD has been configured using the unencrypted design, the design must continue to be protected from unauthorized discovery.

A Nov. 24, 1997 publication by Peter Alfke of Xilinx, Inc. entitled "Configuration Issues: Power-up, Volatility, Security, Battery Back-up" describes several steps that can be taken to protect a design in an existing FPGA device having no particular architectural features within the FPGA to protect the design. Loading design configuration data into the FPGA and then removing the source of the configuration data but using a battery to maintain continuous power to the FPGA while holding the FPGA in a standby non-operational mode is one method. However, power requirements on the battery make this method impractical for large FPGA devices.

Nonvolatile configuration memory is another possibility. If the design is loaded at the factory before the device is sold, it is difficult for a purchaser of the configured PLD device to determine what the design is. However, a reverse engineering process in which the programmed device is decapped, metal layers are removed, and the nonvolatile memory cells are chemically treated can expose which memory cells have been charged and thus can allow an attacker to learn the design. Further, nonvolatile memory requires a more complex and more expensive process technology than standard CMOS process technology, and takes longer to bring to market.

It is also known to store a decryption key in nonvolatile memory in a PLD, load an encrypted bitstream into the PLD and decrypt the bitstream using the key within the PLD. This prevents an attacker from reading the bitstream as it is being loaded into the PLD, and does retain the key when power is removed from the PLD. Such an arrangement is described by Austin in U.S. Pat. No. 5,388,157. But this structure does not protect the user's design from all modes of attack.

In addition to design protection, some users need data protection. They may have generated data within the PLD that should not be lost when the PLD loses power. It is desirable to protect such data.

There remains a need for a design protection method that is convenient, reliable, and secure.

SUMMARY OF THE INVENTION

The invention provides several structures and methods for protecting a PLD from unauthorized use and data loss.

If the PLD is configured by static RAM memory that must be loaded on power-up, the configuration data must be protected as it is being loaded into the device. As in the prior art, this is accomplished by encrypting the configuration data for storing it in a memory outside the integrated circuit device, loading one or more decryption keys into the PLD and maintaining the keys in the PLD when powered down, including a decryption circuit within the PLD that uses the key to decrypt the configuration data, generating decrypted configuration data within the PLD and configuring the PLD using the decrypted configuration data.

For additional security, rather than using nonvolatile memory to preserve keys, the invention preferably uses a battery connected to the PLD to preserve the key when power is removed from the PLD. Whereas it is possible to remove a PLD storing keys in nonvolatile memory, decap the PLD and observe which of the nonvolatile bits are programmed to logic 1 and which are programmed to logic 0, it is believed that it is very difficult to determine the contents of keys stored only in static memory cells since power must be maintained to the memory cells storing the keys in order for the keys to even be stored, and the PLD would have to be decapped, delayered, and probed while operating power is continuous to the PLD.

Ways an Attacker can Steal a Design Once Loaded into a PLD

If a key does not offer sufficient security, an attacker may break the encryption code and determine the value of the key. The well-known Data Encryption Standard DES used a 56-bit encryption key, and has been broken in a few hours by a sophisticated computer to reveal the key. DES is described by Bruce Schneier in "Applied Cryptography Second Edition: protocols, algorithms, and source code in C" copyright 1996 by Bruce Schneier, published by John Wiley & Sons, Inc., at pages 265–278. If it is desirable to use such a well known encryption standard, then in order to increase security, the configuration data may be encrypted several times using different keys each time, thus strengthening the encryption code by about $2^{56}$ each time the encryption is repeated. Or it may be encrypted using a first key, decrypted using a second key, and encrypted using a third key, a combination that is part of the triple DES standard. Other encryption algorithms may also be used, and it is not necessary to keep the algorithm secret since the security resides in the key. When the encryption method is symmetrical, the same keys used for encryption are stored in the PLD and used in reverse order for decryption.

In a PLD offering multiple keys, if the number of keys to be used and the addresses of all keys were provided in an unencrypted bitstream, an attacker might be able to attack the keys one at a time and more easily determine the key values. To avoid such attack, additional security is achieved by storing within the keys, not the bitstream, an indication of how many keys are to be used and whether a key is the last key of a set or whether more are to follow.

If the PLD offers the option of reading back the bitstream after it has been loaded into the PLD, another method that can be used by an attacker is to read back this bitstream. To avoid this method of attacking the design, in one embodiment, a PLD that offers readback and also offers encryption includes the ability to disable the readback feature when encryption has been used. In another embodiment, the PLD that offers the ability to read back encrypts the configuration data before it is read back.

Additionally, some PLDs offer the option of partial configuration (where several configuration addresses are specified for loading several portions of a design) and partial reconfiguration (where an existing design is not erased before new design data are loaded). If the PLD offers these options, an attacker could partially reconfigure a PLD to make successive portions of the design visible, and probably learn the whole design. To avoid such an attack, in one embodiment, partial configuration and reconfiguration of PLDs loaded with encrypted designs are disallowed. In another embodiment, several configuration addresses can be specified, but the addresses are encrypted.

Yet another mode of attack is to try to flip a bit that indicates the security status of the PLD. Lowering or raising the operating voltage, changing the temperature, and applying noise to certain ports come to mind. To protect against such bit-flipping, when the PLD is operating with a secured bitstream, a secure-mode flag is set, and in one embodiment, if this flag becomes unset, all configuration data is erased. In another embodiment that doesn't allow for reconfiguration while the device is still operating, the configuration data is erased before any bitstream is sent.

Another mode of attack is to relocate portions of the encrypted bitstream so that when they are unencrypted they are placed into visible portions of the PLD not intended by the designer. To prevent this relocation, address information is used in the encryption and decryption processes so that sending a portion of an encrypted bitstream to a different PLD location from that intended by the designer will cause it to decrypt differently into data with no meaning. Cipher block chaining (CBC) is one effective means of achieving this result. In cipher block chaining, the decrypted data packet (block) is combined using the XOR function with the next data block before the next block is decrypted, thus the encrypted data for each data block depends on every block that preceded it and on the order of those blocks. Identical blocks of data will encrypt to different values depending on the value of the data blocks that preceded them. This way, if the order of the blocks is changed, the bitstream will not decrypt correctly because the place where the encrypted bitstream is rearranged will scramble subsequent data. Further, the initial CBC value can be modified to incorporate the address of the data to force the decrypted data to be placed at a specific location in order to decrypt correctly.

Alternatively, if the PLD allowed part of a design to be encrypted and part to be unencrypted, the attacker could add an unencrypted portion to the encrypted portion that would read out information about the encrypted portion of the design. Thus, additional security is achieved by permitting the design to be totally encrypted or totally unencrypted, but not to be mixed. Further to this, in one embodiment, when data are being encrypted, additional security is provided by allowing only a single full-chip configuration following a single starting address for the configuration data.

Further, in order to allow convenient testing and debugging and to allow the PLD manufacturer to communicate freely with its customers (the designers who produce the designs for configuring the PLD), the PLD has both encrypted and unencrypted modes of operating, and when operating in the encrypted mode, parts of the configuration bitstream that control loading of the configuration data into the PLD are still not encrypted.

As another mode of attack, if the PLD manufacturer gives information freely about the configuration bitstream format, including header information and addresses for loading configuration data, and gives information about the encryption method used, encrypting this well known information would expose the encryption key to possible discovery. Such exposure is avoided by encrypting only the actual configuration data and leaving control information unencrypted.

If the PLD manufacturer allows the key memory to be used in both secure and non-secure modes, an attacker could simply learn the keys by placing the key memory into non-secure mode and reading out the keys. To avoid such attack, the PLD manufacturer includes a circuit that causes all keys plus any configuration data loaded into the PLD to be erased when the key memory is moved to non-secure mode.

BRIEF DESCRIPTION OF THE DRAWINGS

FIGS. 2a, 2b, 2c, and 2d show bitstream format and commands that can be included in a prior art bitstream.

FIGS. 4a, 4b, 4c, and 4d show bitstream format and commands that can be included in a bitstream of the present invention.

FIGS. 5a and 5b show example unencrypted and encrypted bitstreams.

FIG. 7b shows the corresponding starting value and decryption process used with FIG. 7a.

FIG. 10a shows the structure of key memory 23 of FIG. 3.

FIG. 10b shows the structure of the memory cells of FIG. 10a.

FIG. 12 shows in more detail the battery supply switch of FIG. 10a.

DETAILED DESCRIPTION

Figure 1:
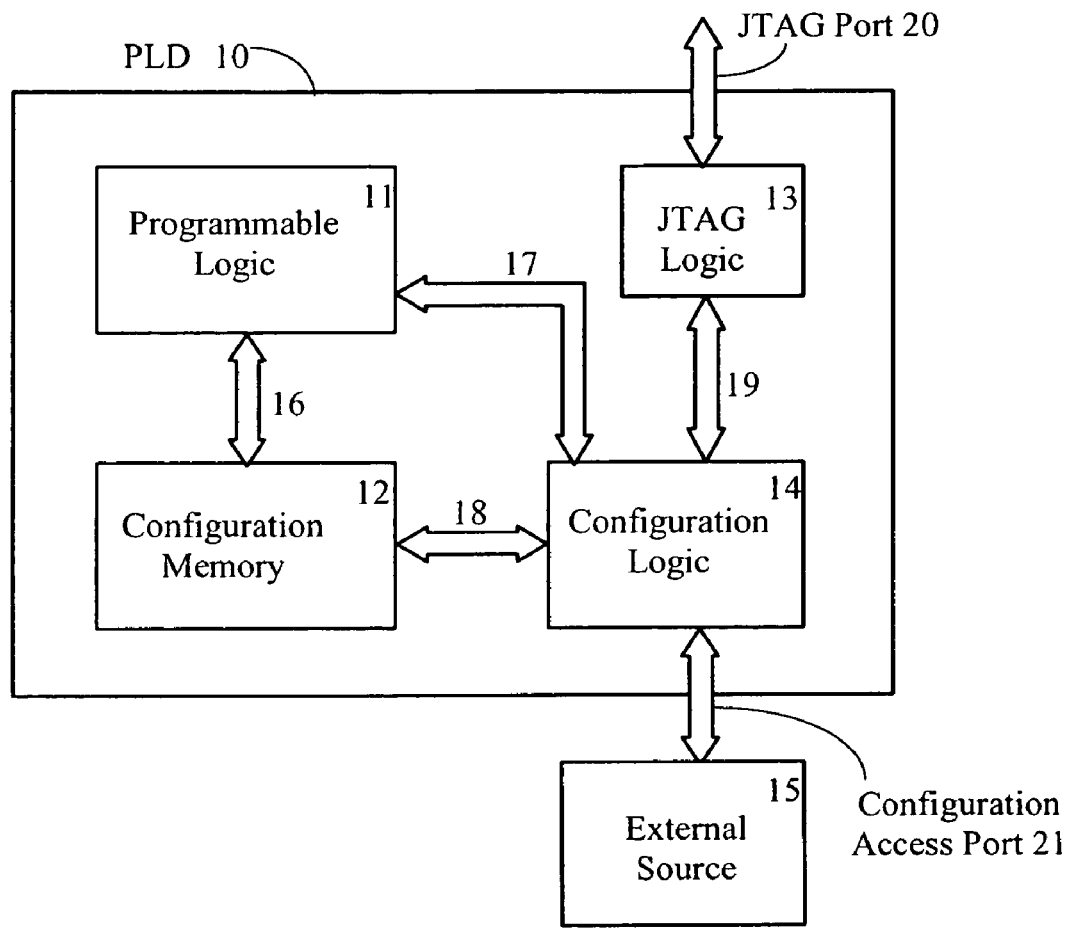
FIG. 1 shows functional relationships in a prior art FPGA.

FIG. 1 shows a prior art structure for an FPGA 10. The FPGA includes programmable logic 11, typically comprising (1) logic blocks with lookup table combinatorial logic function generators, flip flops for storing lookup table outputs and other values, and multiplexers and logic gates for enhancing the logic ability of the programmable logic (2) routing lines and programmable interconnection points for routing signals around the FPGA, and (3) input/output blocks for driving signals between the routing lines and the external pins of the FPGA.

The FPGA also includes configuration memory 12 for turning on routing transistors, controlling multiplexers, storing lookup tables and controlling the input/output blocks, all of this for the purpose of configuring the FPGA to perform the function desired by the designer(s). Bus 16 connects configuration memory 12 to programmable logic 11 and is typically a distributed set of control lines located throughout the FPGA. Some Xilinx products (e.g. XC6200) have included a bus 17 by which programmable logic 11 causes configuration logic 14 to send programming information to configuration memory 12. Such a structure is described by Kean in U.S. Pat. No. 5,705,938.

FPGA 10 further includes a JTAG logic block 13 for interfacing with JTAG port 20, especially intended for testing of the board in which the FPGA will be placed. JTAG logic block 13 implements the IEEE standard 1532, which is a superset of the IEEE standard 1149.1. JTAG allows debugging of a design at the board level.

Finally FPGA 10 includes configuration logic 14 for responding to a configuration bitstream from external source 15 on configuration access port 21 and for interfacing with JTAG logic block 13. The bitstream on configuration access port 21 is treated as words, in one embodiment 32-bit words. Several of the words, usually at or near the beginning of the bitstream, are used for setting up the configuration process and include, for example, length of a configuration memory frame, and starting address for the configuration data. Bus 19 allows communication between configuration logic 14 and JTAG logic block 13 so that the JTAG port can be used as another configuration access port. Bus 18 allows communication between configuration logic block 14 and configuration memory 12. In particular, it carries addresses to select configuration frames in memory 12, control signals to perform write and read operations, and data for loading into configuration memory 12 or reading back from configuration memory 12.

Configuration Logic block 14 receives instructions and data, and processes the data according to the instructions. These instructions come into configuration logic 14 as a bitstream. An instruction, or header, is usually followed by data to be acted upon. FIG. 2a shows an example bitstream structure. Header A specifies an action and specifies that a single word, Data A, will follow. Header B specifies an action and in this case specifies that 4 words of data will follow to be acted upon.

FIG. 2b shows the default format (format type 001) for a 32-bit header word in the bitstream used in the Virtex® devices available from Xilinx, Inc. (Virtex is a registered trademark of Xilinx, Inc., assignee of the present invention). This format includes three bits to indicate the format type (001), two bits to specify an op code, 16 bits for a configuration logic register address, and 11 bits for a word count. The op code can designate a read operation, a write operation, or no operation. For example, 00 can designate no operation, 01 can designate read and 10 can designate write. The 11 bits for word count can specify $2^{11}$ words or 2048 words. As shown in FIG. 2c, if the word count is greater than this, the word count bits in format type 001 are set to 00000000000 and the header of format type 001 is followed by a header of format type 2. Format type 2 uses 27 bits to specify word count, and can thus specify $2^{27}$ words or 2.68 million words.

FIG. 2d shows the kinds of control information that can be loaded into the registers of Configuration Logic 14 by headers for a Virtex bitstream. For example, a header (of format 001) having the configuration logic register address 0000 specifies that the next 32-bit data word should be loaded into the cyclic redundancy check (CRC) register. (Virtex devices use a 16-bit cyclic redundancy check value so some bits will be padded with 0's.) If the header includes an address 0001, the next data will be loaded into the Frame Address register in order to specify a frame (column) in configuration memory 12 to receive or provide data.

The Configuration Logic Register address (16 bits) shown in FIG. 2b provides the 4-bit values shown in the left column of FIG. 2d that select one of the registers in configuration logic 14 (FIG. 1) into which to place the next 32-bit data word. The Frame Length register (address 1011) specifies the length of the frame into which the configuration data will be loaded. (Frame length, or column height, depends upon the size of the PLD. Larger PLDs usually have taller columns or longer frames. Specifying the frame length in the bitstream and storing the frame length in a register rather than providing a different structure in the PLD for placing the data words into frames allows the internal configuration logic to be identical for PLDs of different sizes.)

For readback, a read command is placed in the op code field and the Frame Data Output register is addressed, followed by a Word Count (using Command Header Format 2 if necessary). The specified number of words is read back from configuration memory 12, starting at the address specified in the Frame Address register, and shifted out on either configuration access port 21 or JTAG port 20. (Readback data is returned to the port that issued the readback instruction).

Specifying a word count in a bitstream header or pair of headers (FIGS. 2b and 2c) sets a counter that counts down as the data words are loaded. For many configuration logic register addresses the word count is 1. But if the bitstream header has a configuration logic address of 0010 or 0011 to indicate configuration data are being loaded in or read back, the word count will be much larger. This is when header format 2 of FIG. 2c is used. Data loaded into configuration memory 12 through the frame data input register (address 0010) or read out through the frame data output register (address 0011) is called the design data because it causes the FPGA to implement a design or shows the status of a design. The other register data are control data since they control how the configuration logic behaves while the logic is being configured or read back.

Further detail about configuration of Virtex devices can be found in the "Virtex Configuration Guide" published Oct. 9, 2000 by Xilinx, Inc. (assignee of the present invention), 2100 Logic Drive, San Jose, Calif. 95124. This configuration guide is incorporated herein by reference.

Configuration logic 14 typically performs a cyclic redundancy check on a configuration bitstream coming in (see Erickson, U.S. Pat. No. 5,321,704 incorporated herein by reference, or see pages 39 through 40 of the above referenced Virtex Configuration Guide), reads header bits indicating the frame length of the part being configured and the word count of the configuration data, reads address instructions identifying where to load configuration data, collects frames of configuration data and loads them into columns of configuration memory 12 indicated in the addresses. Configuration logic 14 also controls readback of configuration data and flip flop values from configuration memory 12 to an external location. In a Virtex FPGA available from Xilinx, Inc., readback can be done through either JTAG port 20 or through configuration access port 21.

Configuration logic 14 can also receive configuration data from programmable logic 11. More information about prior art FPGA structures in which part of the FPGA configures another part of the FPGA can be found in Kean, U.S. Pat. No. 5,705,938. More information about architectures of FPGAs similar to the Virtex architecture can be found in Young et al., U.S. Pat. No. 5,914,616. Both patents are incorporated herein by reference. The format of a bitstream used with the Virtex product available from Xilinx, Inc., assignee of the present invention, is described in an Application Note, XAPP138, entitled "Virtex FPGA Series Configuration and Readback" available from Xilinx, Inc., 2100 Logic Drive, San Jose, Calif. 95124 published Oct. 4, 2000.

PLD with Decryption

Figure 3:
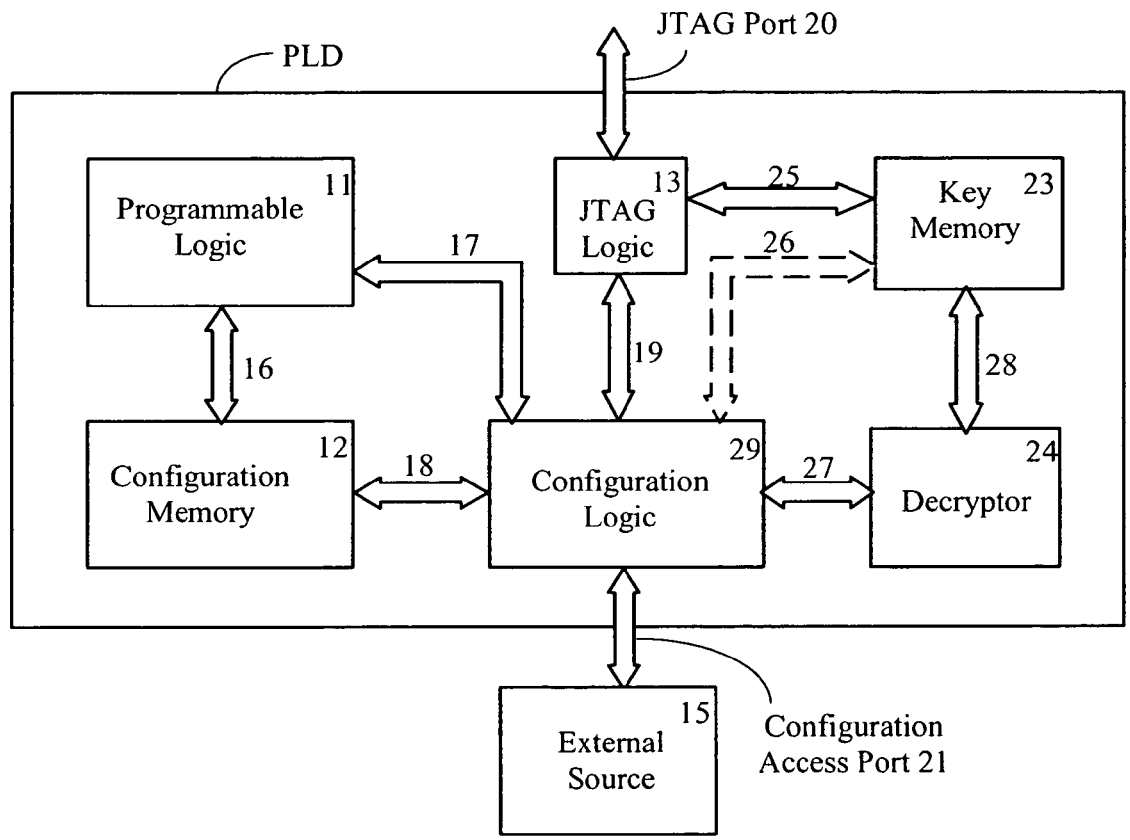
FIG. 3 shows functional relationships in an FPGA according to one embodiment of the present invention.

FIG. 3 shows a block diagram of an FPGA (a type of PLD) according to one embodiment of the present invention. Some elements are the same as shown in FIG. 1, are given the same reference numbers, and not explained again. In addition, FIG. 3 includes an expanded configuration logic unit 29, a decryptor 24 and a key memory 23. FIG. 3 shows an embodiment in which key memory 23 is loaded on bus 25 from JTAG access port 20. In other embodiments, key memory 23 is loaded through another port. Bus 25 carries data, addresses, and control signals to perform write and read operations and allows programming of the decryption keys from JTAG port 20. In one embodiment, bus 26 allows programming of the keys from the configuration port. In another embodiment, bus 26 is eliminated. In yet another embodiment, bus 26 is present and bus 25 is eliminated. In an embodiment described further herein, bus 26 carries security data from key memory 23 to configuration logic 29. In one embodiment, bus 27 carries encrypted configuration data from configuration logic 29 to decryptor 24 and carries decrypted configuration data back to configuration logic 29. Bus 28 allows decryptor 24 to access the keys for decrypting data. When the structure of FIG. 3 is being loaded with encrypted data, an attacker who monitors the bitstream as it is being loaded receives only the encrypted bitstream and can not learn the user's design by this method.

Partially Encrypted Bitstream

According to another aspect of the invention, the bitstream comprises two portions, a data portion representing the user's design that can be encrypted or not, and a control portion controlling loading of the bitstream (for example giving addresses of columns in the PLD into which successive portions of the bitstream are to be loaded, providing a cyclic redundancy check (CRC) code for checking reliability of the loading operation, and a starter number for cipher block chaining (CBC), a technique that prevents a "dictionary attack" where the decrypted data can be deduced from the frequency of occurrence of the encrypted data). In a preferred embodiment of the invention, the data portion may be encrypted but the control portion is unencrypted. This provides additional security because the PLD manufacturer needs to describe freely the control features of the bitstream, and if this relatively well known control information were encrypted, an attacker might be able to decrypt this information and use this information to decrypt the entire bitstream. Further, keeping the control portion of the bitstream unencrypted makes it easier for the PLD to use the information.

In another embodiment, used when the order of addresses in which configuration data is loaded may be useful to an attacker in analyzing the design, the address of the configuration data is also encrypted, but other control information in the configuration bitstream remains unencrypted.

Bitstream Format

FIGS. 4a–4d illustrate differences in bitstream format and registers of configuration logic 29 in comparison to the format and registers of configuration logic 14 of the prior art product shown in FIGS. 2a–2d. As shown in FIG. 4a, the bitstream still includes header words followed by data words. In a typical configuration, several control data words will be loaded into registers before encrypted configuration data begins. FIG. 4a shows an example in which three header words Header A, Header B, and Header C are each followed by three unencrypted control data words Data A, Data B, and Data C. (In an actual configuration, more than three control data words will likely be provided.) Next, Header D specifies that encrypted configuration data will follow and is followed by multiple words Data 1D, Data 2D, Data 3D, etc. of encrypted configuration data. These words have been shaded in FIG. 4a to emphasize that this data is encrypted.

As shown in FIGS. 4b and 4c, a fourth op code has been added. In addition to the values 00 for no operation, 01 and 10 for read and write without decryption, the new value 11 specifies that writing is to be with decryption. (It is not important what code or what method is used to specify that decryption is to be used or even that it is specified through an op code. It is just important that optional encryption and decryption be allowed and indicated, so that designers can make use of this option. In the embodiment of FIG. 4d, two new configuration logic registers are added. Shown at addresses 1100 and 1101 are the register for holding a cipher block chaining (CBC) starter value and the address for the initial encryption key.

Optional Encryption

According to another aspect of the invention, a PLD can accept both encrypted and unencrypted data portions of the bitstream. The control portion of the bitstream indicates whether the data portion of the bitstream is encrypted. If the data portion of the bitstream is encrypted, it is diverted within the PLD to a decryptor and after decryption is used to configure the PLD. If unencrypted, it is not diverted, and is used directly to configure the PLD.

There are some occasions for which it is preferable not to encrypt the bitstream. Certain test activities used during debugging a design require reading back the configuration information. It is more straight forward to diagnose a configuration problem if an encryption step has not been performed (especially if the designer is trying to determine whether encryption has anything to do with the problem). Also, if several designers are writing code to be implemented in parts of the PLD and different parts of the PLD are to be configured at different times, it may be necessary to make all portions of the bitstream visible, and to allow the PLD to be partly reconfigured.

FIGS. 5a and 5b show example bitstream portions representing the same design, first unencrypted and then encrypted, to illustrate the differences between an unencrypted bitstream and an encrypted bitstream in one embodiment of the invention. An actual bitstream includes the 0's and 1's at the right of the figures and none of the text at the left. The text at the left is provided to explain the meaning of the bits to the right. These bitstream portions use the commands illustrated in FIGS. 4b –4d. In order to emphasize the differences between the unencrypted version of FIG. 5a and the encrypted version of FIG. 5b, the differences are shown in bold.

Looking at FIG. 5a, after a dummy word (a constant high signal interpreted as all 1's) and a sync word with a specified pattern of 1's and 0's, the next word is of type 001 with an op code of 10, has an address of 0000000000010000 and a word count of 00000000001. Thus this word addresses the command register CMD and specifies that one word will be written there. FIG. 5a has been annotated to the left of the bitstream to indicate that this word is Type 1 and indicates to write 1 word to CMD. The following word 111 is the data to be placed in command register CMD, and resets a CRC (cyclic redundancy check) register. (In a preferred embodiment, the PLD includes a circuit, not shown, such as described by Erickson in U.S. Pat. No. 5,598,424 to calculate a CRC value from the bitstream as the bitstream is being loaded, and protects against glitches in the bitstream voltages that might cause incorrect bits to be loaded.) Next, a header word specifies that the format is again type 1 and it specifies to write 1 word to the frame length register FLR. The data word that follows, 11001, specifies the frame length (25 words). Similarly, several additional header and data words follow, including the header specifying the word to be written to the frame address register FAR. In this case, the following data word indicates data will start at address 0. Finally, after these registers have been loaded, a command comes to write data to the frame data input register FDRI, and since quite a bit of data will be written, the word count is given as 00000000000 and a header of type 2 specifies that 10530 words will be written to the FDRI register. This is the actual design data that causes the PLD to be configured. Thus the next 10530 words in the bitstream are design data. Finally, to assure that data have been loaded correctly, the CRC value calculated by the device that originated the configuration data is loaded and compared to the CRC value that has been calculated by the PLD. Additional commands and data are loaded in order to indicate that configuration is complete and to move the PLD into operation mode.

FIG. 5b is similar to FIG. 5a, and differs only where the data and annotations are shown in bold. In FIG. 5b, the data are encrypted, and additional commands are used to provide the initial key address and to write two words (64 bits) to the CBC (cipher block chaining) register. Next, a type 1 header includes the op code 11 and indicates that data will be decrypted before being written to frame data input register FDRI. A type 2 header follows, again with the op code 11, giving the instruction that 10530 words are to be decrypted and written to data input register FDRI. The 10530 encrypted data words then follow. Then the CRC word follows for confirming that the (encrypted) data were loaded correctly. Finally, the additional commands and data are sent, and place the PLD into operation mode if all is correct.

Decryption Process

Figure 6:
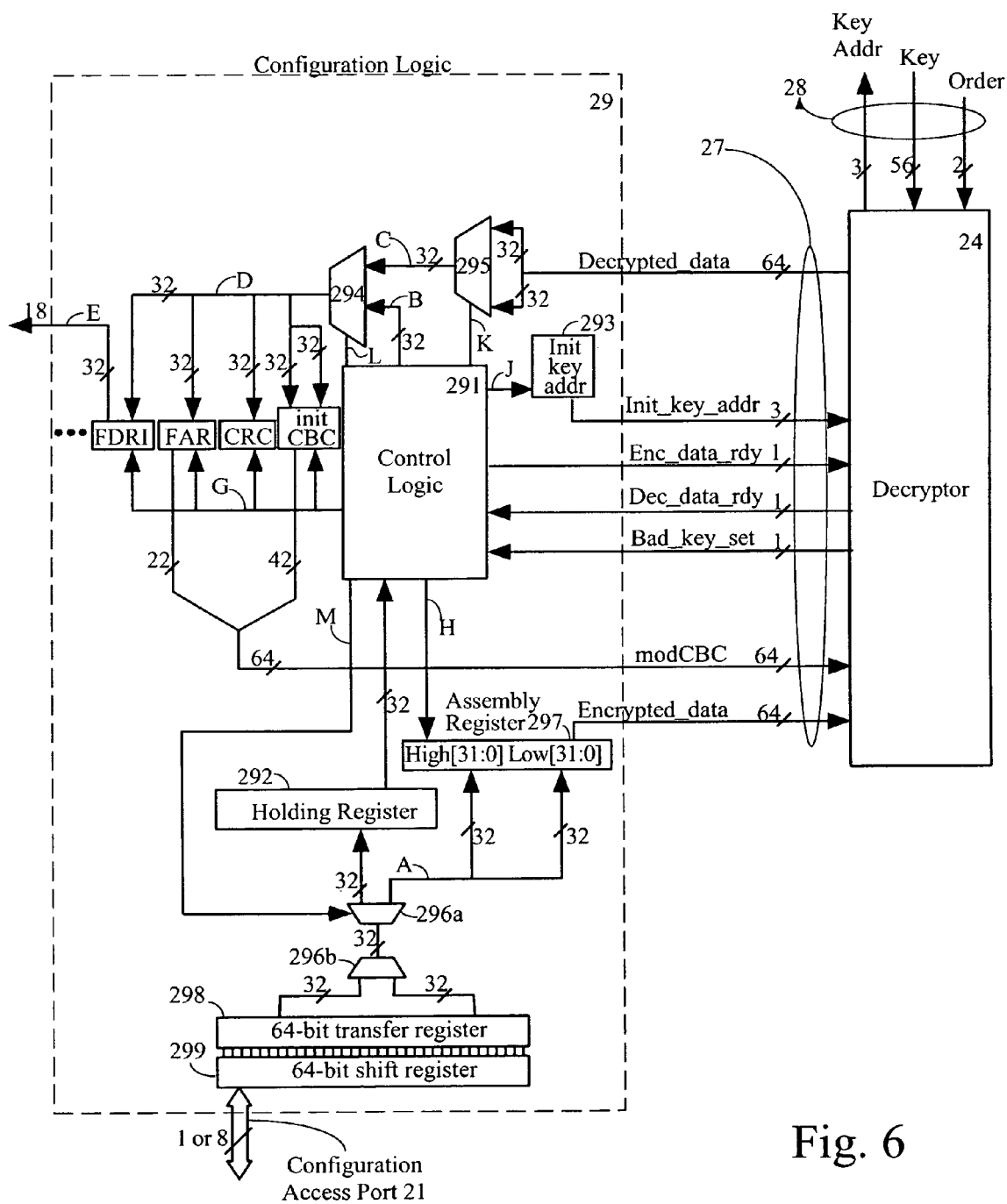
FIG. 6 shows configuration logic 29 and the lines in bus 27 and bus 28 leading to decryptor 24.

FIG. 6 shows how optional decryption is accomplished in one embodiment. FIG. 6 shows the detail of configuration logic 29 and of buses 27 and 28 leading into decryptor 24. Bus 27 includes the following:

the 3-bit initial decryption key address "Init_key_addr" taken from register address 1101 (FIG. 4d) in configuration logic 29, the 64-bit modified cipher block chaining value "mod-CBC". This value is formed by replacing the lower order bits of the 64-bit CBC value taken from register address 1100 (FIG. 4d) in configuration logic 29 with the 22-bit Frame Address value specified in Register 0001.

the 64 lines "Encrypted_data" for loading encrypted data, taken from the bitstream, the 64 lines "Decrypted_data" for returning the decrypted data produced by decryptor 24 to configuration logic 29, a line for the signal "Enc_data_rdy" that tells decryptor 24 that data is on the "Encrypted_data_lines and that decryptor 24 can start decrypting, a line for the signal "Dec_data_rdy" that tells configuration logic 29 that decryption on a 64-bit word is complete and is available on the "Decrypted_data" lines, and a Bad_key_set line used by decryptor 24 to cause configuration logic 29 to abort the configuration and set a status register accordingly when the keys have not been used as specified, for example, by the bits in key memory that designate whether the keys are to be first, middle, or last of a set. In the embodiment shown in FIG. 4d, the status register is at address 0111, and the Bad_key_set error is indicated by storing a logic 1 in one of the bits.

Bus 28 is comprised of the following:
3 lines for the key address, which is initially the key address provided from bus 27, but which is updated each time a new key is used,
56 lines for the decryption key, and
2 lines for indicating whether the decryption key is the first, middle, last, or only key to be used.

Preventing Design Relocation

One potential attack on a design in an encrypted bitstream is to change the frame address register (starting address) in the encrypted bitstream so that when it is decrypted it is loaded into a portion of the FPGA visible when the FPGA is being used. In some designs the content of the block RAM is visible. In all designs the configuration of the input/output ports is visible and therefore the configuration bits can be determined. Thus if successive portions of the design were moved to visible portions of the FPGA, even though the FPGA did not function properly, an attacker could in repeated relocation learn the contents of the unencrypted bitstream.

Figure 7A:
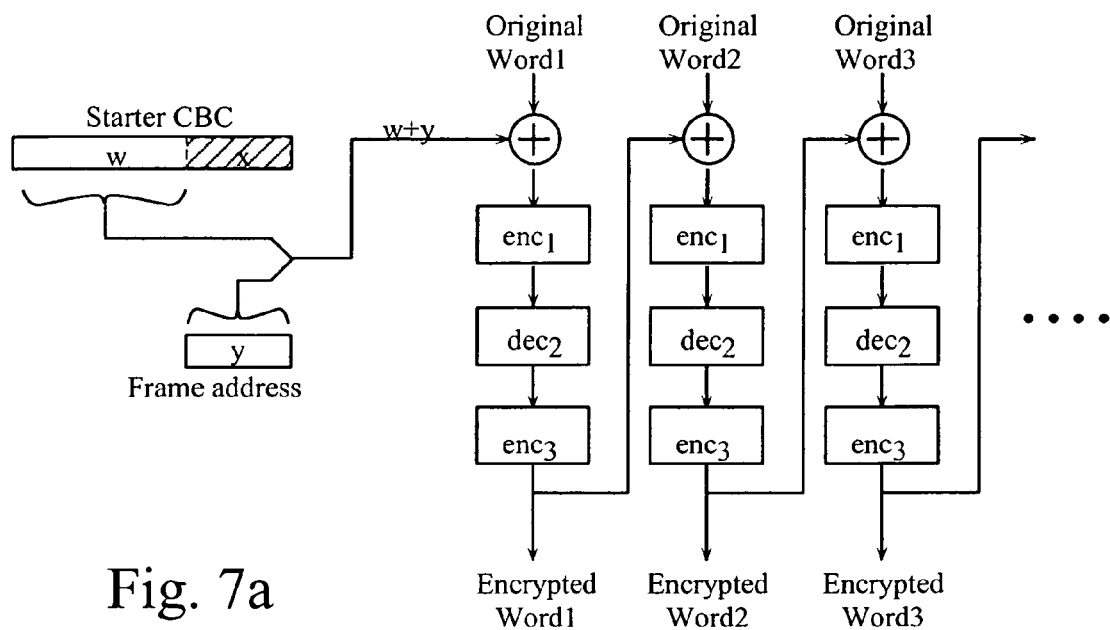
FIG. 7a shows the modified starting value for outer cipher block chaining with triple encryption used in one embodiment of the invention.
Figure 7B:
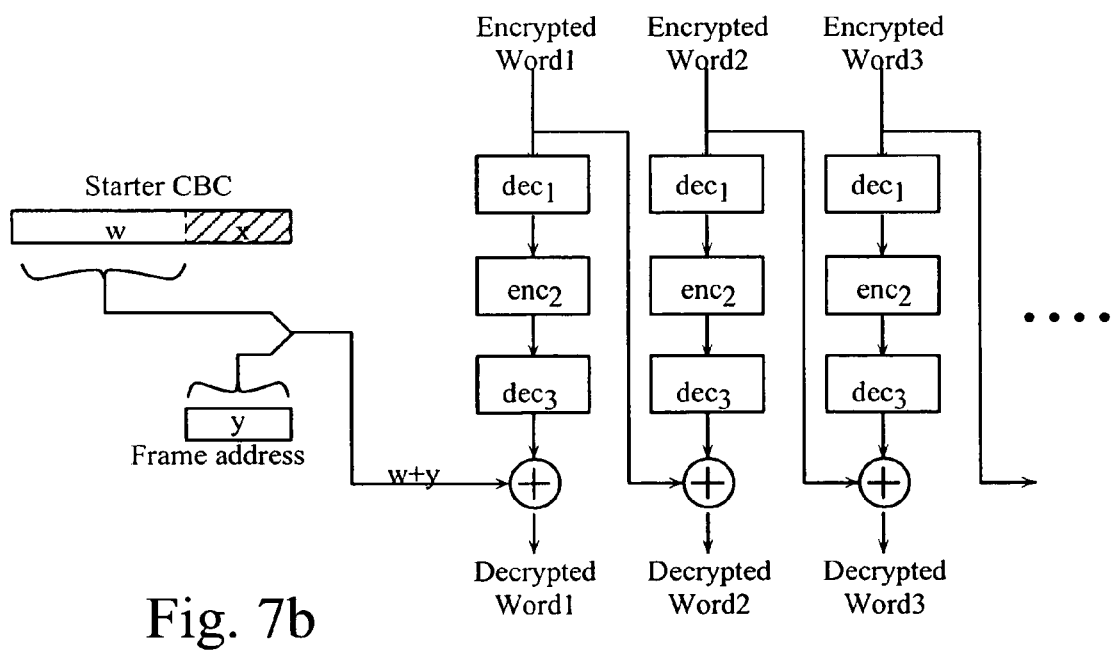

To prevent design relocation, in one embodiment, an initial value used by the cipher block chaining method used with the DES standard is modified. FIGS. 7a and 7b show the encryption and decryption portions of a triple DES algorithm, respectively, as modified according to the invention. The standard cipher block chaining method starts the encryption process by XORing a starting number (can be designer supplied or randomly generated) with the first word of data to be encrypted. According to the invention, part of the random number is replaced by address information, in the present example the 22-bit address of the first frame into which data will be loaded in configuration memory 12. The starter CBC value, a 64-bit number, has its least significant bits, labeled x, replaced by the frame address, labeled y, to produce a modified 64-bit value that depends upon the address into which data will be loaded. This modified CBC value is XORed with the first word of configuration information Word1. Then the encryption algorithm is used to produce the first encrypted word Encrypted Word1, which is placed into the bitstream. FIG. 7a shows a triple encryption algorithm with outer cipher block chaining, comprising an encryption step $enc_1$ using the first key, followed by a decryption step $dec_2$ using the second key, followed by an encryption step $enc_3$ using the third key. This first encrypted word Encrypted Word1 is XORed with the second unencrypted word Word2 and the encryption process is repeated to produce encrypted Word2. The XOR chaining continues until all configuration data have been encrypted.

As shown in FIG. 7b, the PLD must perform the reverse process to derive the decrypted words. For the above encryption sequence, the decryption sequence would be decryption step $dec_1$ using key 3, then encryption step $enc_2$ using key 2, then decryption step $dec_3$ using key 1. Importantly, part of the initial value for generating Decrypted Word1 is to use the same frame address for both encryption and decryption. The PLD, not the bitstream, generates the modified CBC value from the frame address stored in the frame address register, which is also used to specify the frame of configuration memory 12 into which configuration data are to be loaded. So if an attacker changes the frame address into which the data are to be loaded, the modified CBC value changes accordingly, and the configuration data are not correctly decrypted.

The XOR step produces the original data that was in the designer's bitstream before it was encrypted. Original Word1=Decrypted Word1, for example. This decrypted configuration data is sent on bus 27 (FIG. 3) to configuration logic 29.

Configuration Logic 29

Configuration logic 29 includes the structures to support optional encryption as well as the structures to prevent design relocation and a single key attack. As shown in FIG. 6, configuration logic 29 includes a holding register 292, control logic 291, configuration registers (FDRI, FAR, CRC, and init CBC are shown), decryptor 24 interface multiplexers 294 and 295, 64-bit assembly register 297, and registers 298 and 299 (for interfacing with configuration access port 21). A 64-bit shift register 299 receives data from configuration access port 21, which can be a single pin for 1-bit wide data or 8 pins for 8-bit wide data. This data is loaded into 64-bit shift register 299 until register 299 is full. Then these 64 bits are preferably shifted in parallel into 64-bit transfer register 298. From there, multiplexer 296b alternately selects right and left 32-bit words, and multiplexer 296a moves the data 32 bits at a time either into holding register 292 or alternately into High and Low portions of assembly register 297 as controlled by control line M. When loading of the bitstream begins, line M and a clock signal not shown cause multiplexers 296a and 296b to move data from 64-bit transfer register 298 to holding register 292. From there these words are applied to control logic 291. If the word is a header, control logic 291 interprets the word. If the op code indicates the data to follow are to be written unencrypted, control logic 291 places an address on bus G to select a register, places a signal on line L to cause multiplexer 294 to connect bus B to bus D, and applies the following word on bus B. On the next clock signal (clock signals are not shown), the data on bus D are loaded into the addressed register. All registers shown in FIG. 4d can be loaded this way. The init CBC register for loading the initial cipher block chaining value is a 64-bit register and receives two consecutive 32-bit words, as shown in FIG. 5b and discussed above.

A modified CBC value formed from (1) the original CBC value stored in the init CBC register and (2) the initial frame address stored in the FAR register is available to decryptor 24. In one embodiment, the initial frame address in the FAR register uses no more than 32 bits while the init CBC value uses 64 bits. In the embodiment of FIG. 6, the 64-bit bus providing the modified CBC value includes 22 bits from the frame address register FAR and 42 bits from the init CBC register. Important to the security provided by the present invention, note that this value depends upon where configuration data will be loaded. If an attacker were to try to load encrypted data into a different place by changing the contents of the FAR register, the modCBC value fed to decryptor 24 would also change.

When the op code command to decrypt a number of words of configuration data is received by control logic 291, the decryption process begins. Control line M causes multiplexer 296a to apply data from transfer register 298 to bus A leading to assembly register 297. Control bus H alternately connects bus A to the High[31:0] and Low[31:01] portions of encrypted data register 297 to form a 64-bit word to be decrypted. Control logic 291 then asserts the Enc_data_rdy signal, which causes decryptor 24 to decrypt the data in register 297.

To perform the decryption, decryptor 24 applies a key address KeyAddr on bus 28 to key memory 23 (FIG. 3). This causes key memory 23 to return the 56-bit key in that address on the 56-bit Key lines. It also causes key memory 23 to return two additional bits "Order" also stored in the key data at that address. For the first decryption key, these two bits must indicate that this is a first key or an only key. If not, decryptor 24 asserts the Bad_key_set signal, which causes control logic 29 to abort the configuration operation. If these two bits indicate the key is a first or only key, decryptor 24 performs the decryption, using for example the well known DES algorithm (described by Schneier, ibid). If the key isn't an only key, decryptor 24 then gets the key at the next address in key memory 23, and checks to see if the two Order bits indicate it is a middle or last key. If not, the Bad_key_set signal is asserted and the configuration is aborted. If so, decryption is performed. If it is a middle key, another round of decryption is done. If it is the last key, decryptor 24 forms the XOR function of the decrypted word and the value modCBC. Decryptor 24 then places the resultant value on the 64-bit Decrypted_data bus and asserts the Dec_data_rdy signal. This causes control logic 291 to place signals on control line K to cause multiplexer 295 to break the 64-bit word into two sequential 32-bit words. Control logic 291 places a signal on line L to cause multiplexer 294 to forward the 32-bit words of decrypted data to bus D. Control logic 291 also places address signals on bus G to address frame data input register FDRI. The next clock signal moves the decrypted data to bus E where it is loaded into the frame register and when the frame register is full, eventually shifted into configuration memory 12 at the address indicated in the FAR register.

The modCBC value is used only once in the decryption operation. Subsequent 64-bit words of encrypted data are decrypted and then chained using the previously decrypted data for the XOR operation. (The value stored in the FAR register is also used only once to select a frame address. Subsequently, the frame address is simply incremented every time a frame is filled.)

Flow of Operations

Figure 8:
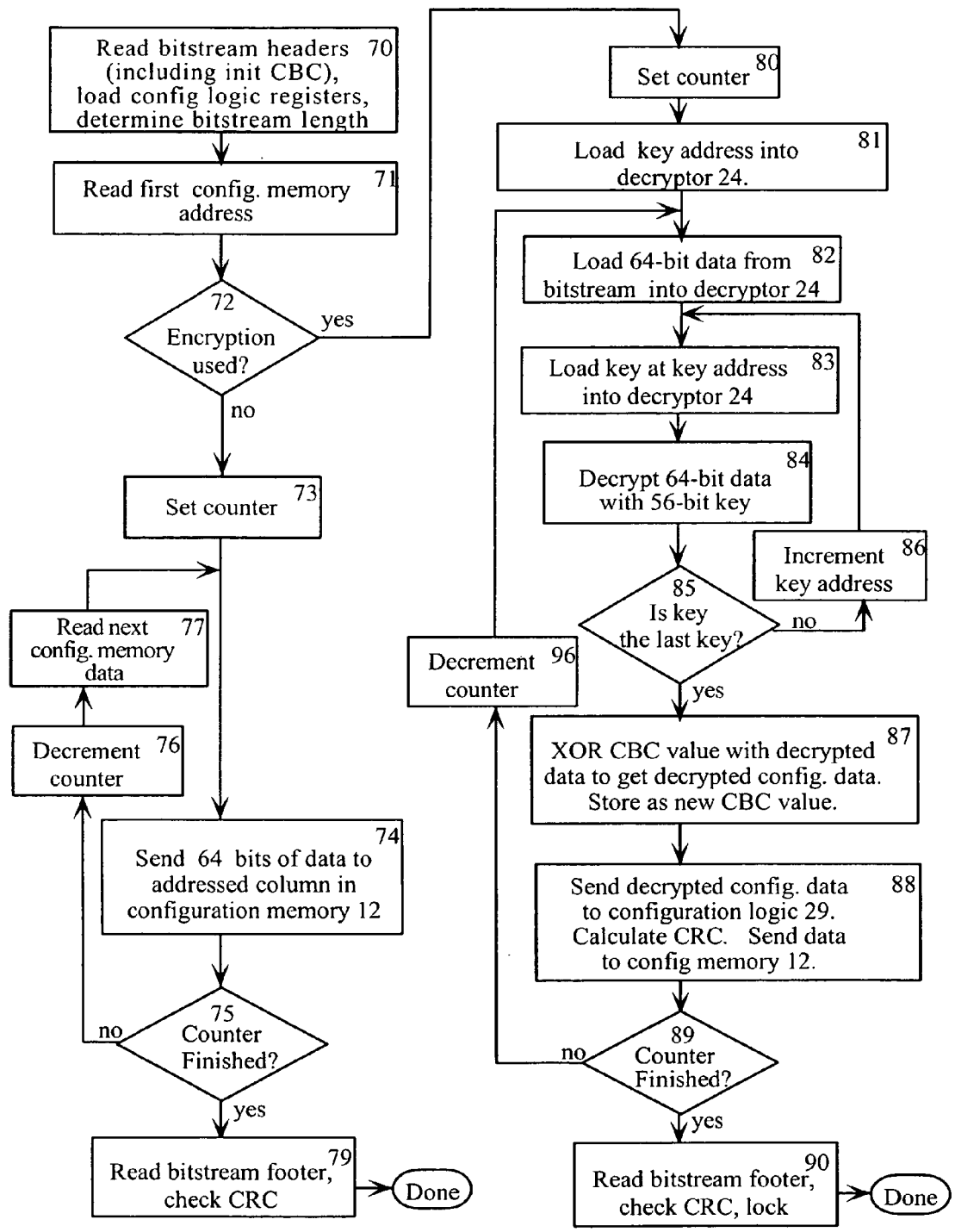
FIG. 8 shows flow of the operations for processing a bitsteam.

FIG. 8 indicates the flow of operations performed by configuration logic 29 and decryptor 24. Configuration logic 29 begins at step 70 by loading the bitstream headers and placing the corresponding data into configuration logic registers shown in FIG. 4b, including determining bitstream length. At step 71, as a further part of the start-up sequence, configuration logic 29 reads the first configuration memory address. Recall that the bitstream format includes an op code that indicates whether encryption is being used. Step 72 branches on the op code value. If encryption is not used, the process is shown on the left portion of FIG. 8. If encryption is used, the process is shown in the right of FIG. 8. For no encryption, at step 73, configuration logic 29 sets a counter equal to the bitstream word count (see FIG. 4c). At step 74, 32 bits (1 word) of configuration data are sent to the addressed frame of configuration memory 12. If step 75 indicates the counter is not finished, then at step 76 the counter is decremented and the next 1 word of configuration data are sent to configuration memory 12. When the counter has finished, configuration logic 29 performs cleanup activities including reading the final cyclic redundancy value to compare with a value at the end of the bitstream to determine whether there were any errors in loading the bitstream.

If step 72 indicates the bitstream is encrypted, the counter is loaded with the word count, and at step 81 the process loads the initial key address from key address register 293 (FIG. 6) into decryptor 24.

At step 82, two words (64 bits) of encrypted configuration data are loaded into decryptor 24. At step 83 the addressed key is loaded into decryptor 24. In one embodiment, a 64-bit number is loaded into decryptor 24. This 64-bit number includes a 56-bit key, two bits that indicate whether it is the first, middle, last, or only key, and some other bits that may be unused, used for parity, or used for another purpose. In another embodiment, the 64-bit key data includes a single bit that indicates whether it is or is not the last key. In yet another embodiment, the 64-bit key data includes an address for the next key so the keys don't need to be used in sequential order. In another embodiment, extra bits are not present and the key data uses less than 64 bits. In yet another embodiment, the bitstream rather than the key indicates how many keys are to be used, but this is believed to be less secure because an attacker can see how many keys are used and perform a single key attack, breaking one key at a time, whereas using the keys to indicate how many keys are to be used does not give this information to an attacker.

At step 84, decryptor 24 decrypts the 64-bit data with the 56-bit key using, for example, the DES algorithm. The DES algorithm is described in the above-mentioned book by Bruce Schneier at pages 265 to 278. Other encryption algorithms may also be used, for example, the advanced encryption standard AES. Other algorithms may require more key bits. For example AES requires a key of 128 to 256 bits.

Step 85 determines whether more keys are to be used. The two bits that indicate whether the key is first, middle, last, or only key are examined to determine whether this is the last key, and if not, the key address is incremented and decryptor 24 addresses the next key in memory 23.

After the last key has been used, at step 87, the modified CBC value shown in FIG. 6 as a 64-bit value from combining registers FAR and init CBC is XORed with the decrypted value obtained in step 87. In one embodiment, 22 bits of the 64-bit random number loaded into the CBC register are replaced with the frame address of the beginning of the bitstream. The goal of the encryption process is to have every digit of the 64-bit encrypted value be a function of all previous bits plus the key. The goal of combining the CBC value with the first address is to cause the decrypted values to change if the bitstream is loaded into a different address from the intended starting address. Step 87 achieves both goals. The new CBC value is then stored. Storage may be in the FAR and init CBC registers shown in FIG. 6, or in another register located in decryptor 24.

At step 88, this decrypted configuration data is sent on bus 27 (FIG. 3) to configuration logic 29. Configuration logic 29 calculates an updated cyclic redundancy check value to be compared with the cyclic redundancy value stored in the CRC register at the end of the loading process. If configuration logic 29 has been set to use encryption, a multiplexer in configuration logic 29 forwards this decrypted configuration data to the addressed column of configuration memory 12.

At step 89 the counter is checked and if not finished, at step 96 the counter is decremented and the process returns to step 82 where the next 64 bits (2 words) are loaded from the bitstream.

Finally, when step 89 indicates the counter is finished, at step 90, a CRC (cyclic redundancy check) value in the bitstream is compared with a CRC value calculated as the bitstream is loaded. If the values agree, configuration is complete and the FPGA goes into operation. If the values do not agree, a loading error has occurred and the entire configuration process is aborted.

Evaluating Key Order—Preventing Single Key Attack

Figure 9:
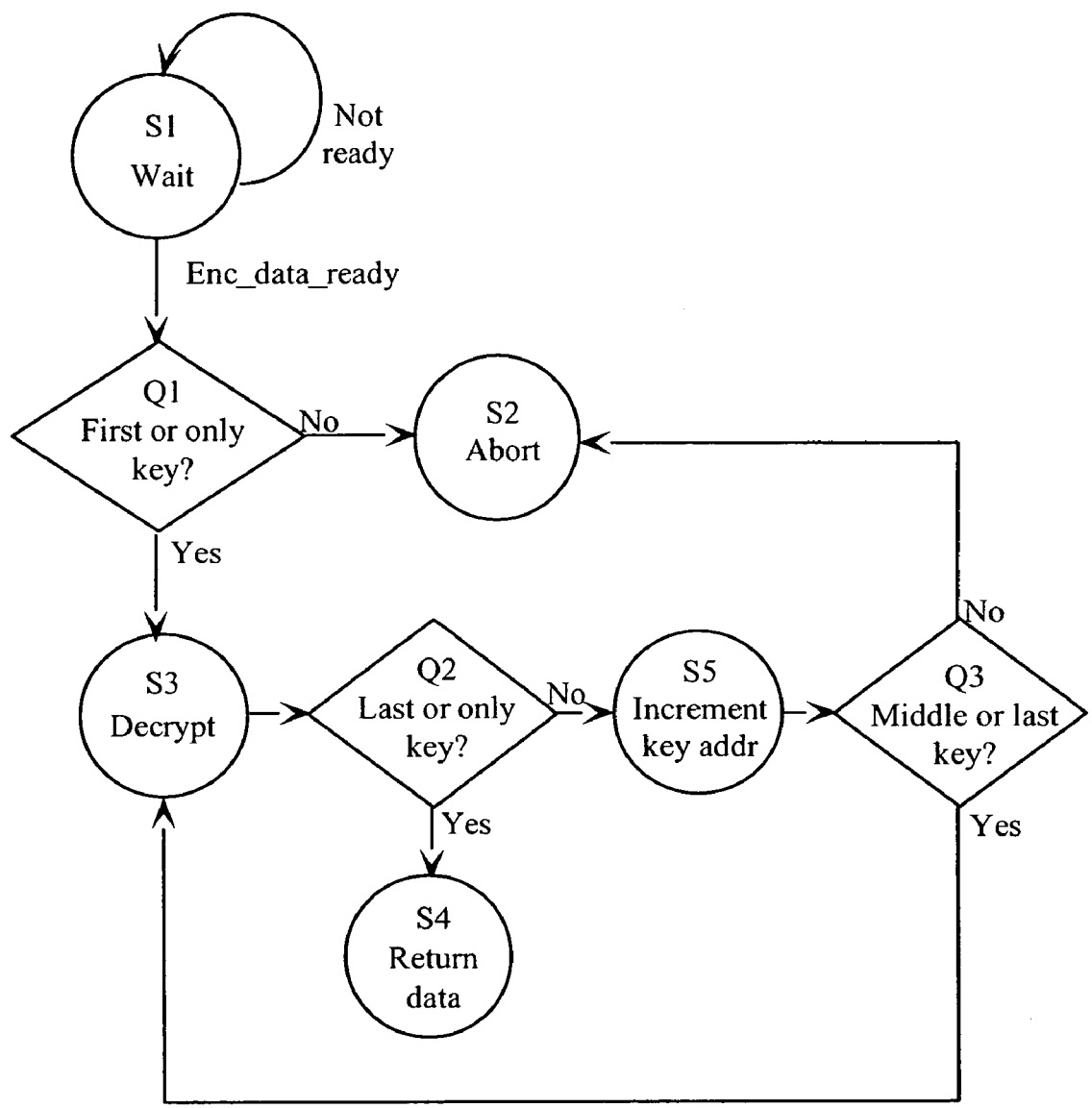
FIG. 9 shows a state machine implemented by decryptor 24 to evaluate key order.

FIG. 9 shows a state machine implemented by decryptor 24 to evaluate key order. The state machine remains in state S1 until the Enc_data_ready signal is activated. This signal indicates decryption can begin and moves to decision state Q1 where decryptor 24 applies the address specified by the address Init_key_addr on bus 27 to bus 28, reads back a key and a key order, and from the two bits of key order data determines whether the key is a first or only key. If not, decryptor 24 sends the Bad_key_set signal to control logic 291 and causes configuration logic 29 to abort the configuration. If the address is first or only, decryptor 24 goes to state S3, which decrypts the data. Then the state machine goes to decision state Q2, which determines whether the key is last or only. If so, decryption is complete and at state S4 decryptor 24 returns the decrypted data to configuration logic 29. If not, in state S5, decryptor 24 increments the key address, and gets the new key. The state machine asks question Q3 to determine whether the next key is a middle or last key. If not, state S2 causes the configuration to abort. If the key is middle or last, the state machine returns to state S3 to decrypt the data again. In another embodiment, in state S4 decryptor 24 also performs the step of XORing the decrypted data with a CBC value.

The benefit of storing the key order within the keys is that an attacker can not implement a single key attack because the attacker can not prevent decryptor 24 from using all the keys specified by key memory 23 (as intended by the designer) when performing decryption. It is not necessary to ask the second and third questions Q2 and Q3 to protect against an attacker using a single key attack, since the key order is stored within the key data inside the PLD. However, it is beneficial to the designer or board tester who loads the keys to ask all three questions to make sure that each key has been labeled correctly when it is loaded.

In one embodiment, decryptor 24 uses the triple DES standard with a decryption-encryption-decryption sequence, alternating the algorithm (only slightly) each time another key is used. Such a combination is in accordance with the ANSI X9.52 1998 Triple DES standard. In another embodiment, decryption is used each time.

Key Memory 23

Figures 10A, 10B:
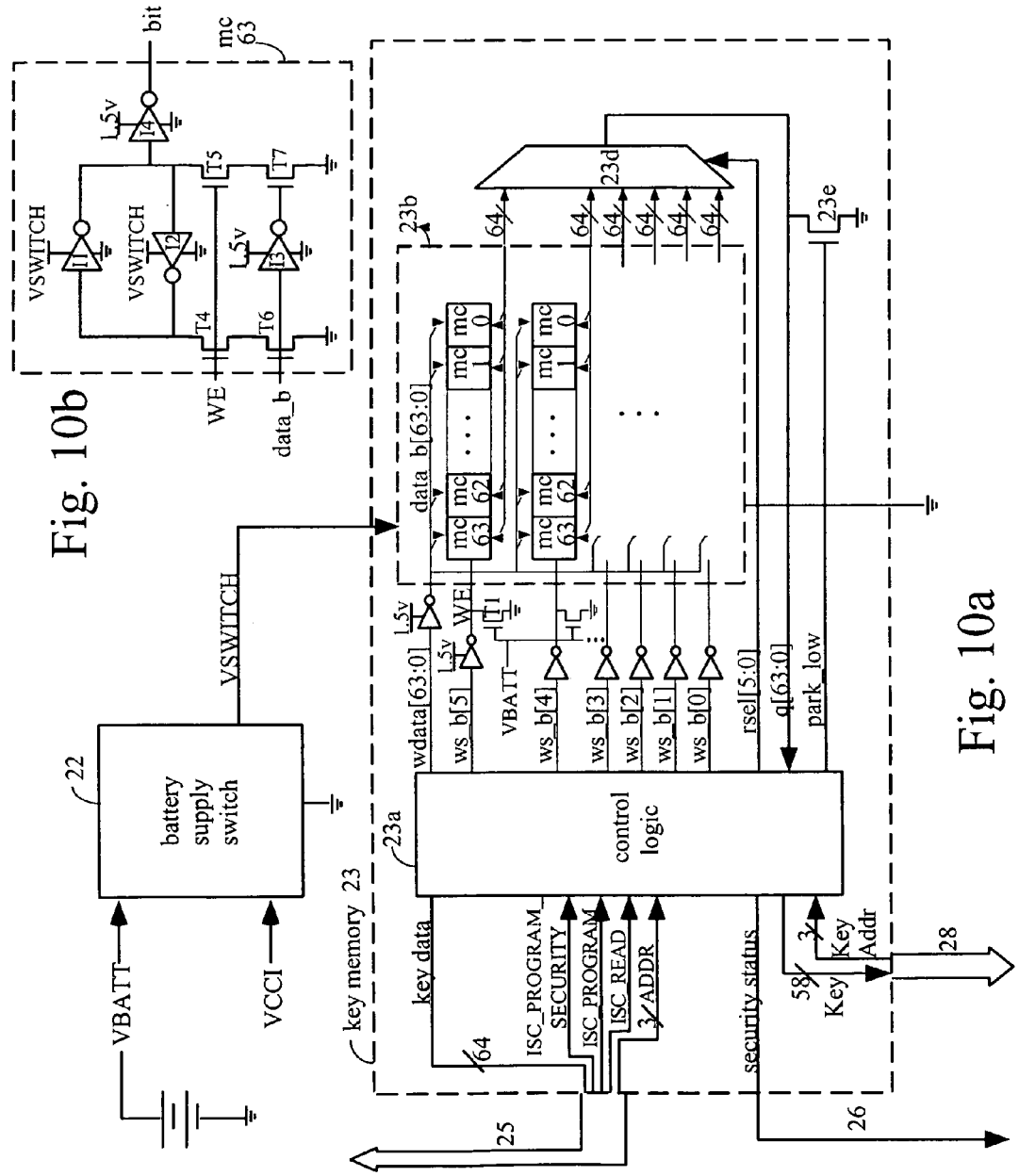

The circuit shown in FIG. 10a includes three components: battery supply switch 22, control logic 23a and key registers 23b. Control logic circuit 23a and key registers 23b comprise key memory 23 of FIG. 3. In the embodiment of FIG. 10a, key registers 23b comprise six 64-bit words. Of course, other key memory sizes may alternatively be used. In other embodiments, there may be far more than six keys stored in key memory 23, and more than 3 bits needed to give the address of the key to be used. The power supply for key registers 23b comes from battery supply switch 22 on line VSWITCH. When key memory supply voltage VCCI is insufficient or not present, battery supply switch 22 applies the battery backup voltage VBATT to the VSWITCH line so that VSWITCH carries a positive voltage.

In this embodiment each key register has 64 memory cells. Each cell receives a write enable signal WE, that when high causes data to be written to the cell and when low causes data in the cell to be held. Cells in one register have a common write enable signal WE. When the PLD supply voltage (different from VCCI) is absent such that the WE signals are not actively driven, weak pull-down transistors such as T1 pull down the WE signal so that none of the key memory registers can be addressed, and none of the memory cells are disturbed.

In one embodiment, the JTAG port of a PLD is used to load decryption keys into the PLD. The memory cell supply voltage is at the device voltage level of VCCI during normal operation, and in one embodiment this level is between 3.0 and 3.6 volts. Signals applied to the JTAG port may be several different voltages. Also, there may be several different internal voltages. Thus voltage translation is needed. This voltage translation is performed in the memory cells. Detail of a memory cell is shown in FIG. 10b. The latch comprising inverters I1 and I2 is powered by VSWITCH and is thus powered whether or not a device supply voltage VCCI is present. The WE signal and the inverted data signal data_b both operate at the 1.5 volt level. These signals drive NMOS transistors T4, T5, and T6, and through inverter I3 (also using the 1.5 volt supply voltage) transistor T7. FIG. 10b shows that when WE is low, transistors T4 and T5 are off, and the content of the latch comprising inverters I1 and I2 is retained. When WE is high, one of inverters I1 and I2 is pulled low, thus loading the new data into the latch.

Control logic circuit 23a receives signals from JTAG bus 25 (also shown in FIG. 3). JTAG bus 25 includes control signals for writing, reading, setting the secure mode, and data and address buses. This interface conforms to the IEEE 1532 JTAG standard. Before key memory 23 can be accessed through JTAG bus 25, the security status (bus 26) is placed in non-secure mode, which can be done using the ISC_PROGRAM_SECURITY instruction (see FIG. 10a) and applying logic 1 to bit 0 of the key data bus. Key memory 23 is written to and read (for verification) from JTAG bus 25 using the ISC_PROGRAM and ISC_READ instructions of the IEEE 1532 standard. Control logic 23a includes a decoder for decoding the 3-bit address signal ADDR from JTAG bus 25 to produce a low-going pulse on the addressed one of write strobe lines ws_b[5:0] if the ISC_PROGRAM instruction appears on JTAG bus 25, or a high signal on the addressed one of read select lines rsel[5:0] if the ISC_READ instruction appears on JTAG bus 25. One of the six 64-bit words can be read by applying a high signal to one of the six read select lines rsel[5:0], which causes read multiplexer 23d to place the selected word on the 64 output lines q[63:0]. Only one of the write select lines or read select lines is selected at one time. When no read select signal is asserted, a high park low signal causes 64 transistors 23e to pull down the 64 lines q[63:0] and prevent these lines from floating.

If key memory 23 is operating in non-secure mode, the 64-bit words can be read from key registers 23b to JTAG bus 25 where the values can be examined external to the FPGA. The FPGA can be tested in this non-secure mode by using 56 bits of a selected 64-bit word in registers 23b as the 56-bit key for DES decryption. In one embodiment, when key memory 23 is in non-secure mode, readback of a user's design is possible even though the design has been encrypted before loading. This allows the designer to test and debug even an encrypted design. Communication of the key security status is through bus 26 (see also FIG. 3).

After values have been written into key registers 23b and verified with a read operation from bus 25, control logic 23a is placed into secure mode by using the ISC_PROGRAM_SECURITY instruction and applying logic 0 to bit 0 of the 64-bit key data bus which is part of the IEEE 1532 standard. In the secure mode, no access to the keys is granted.

Figure 11:
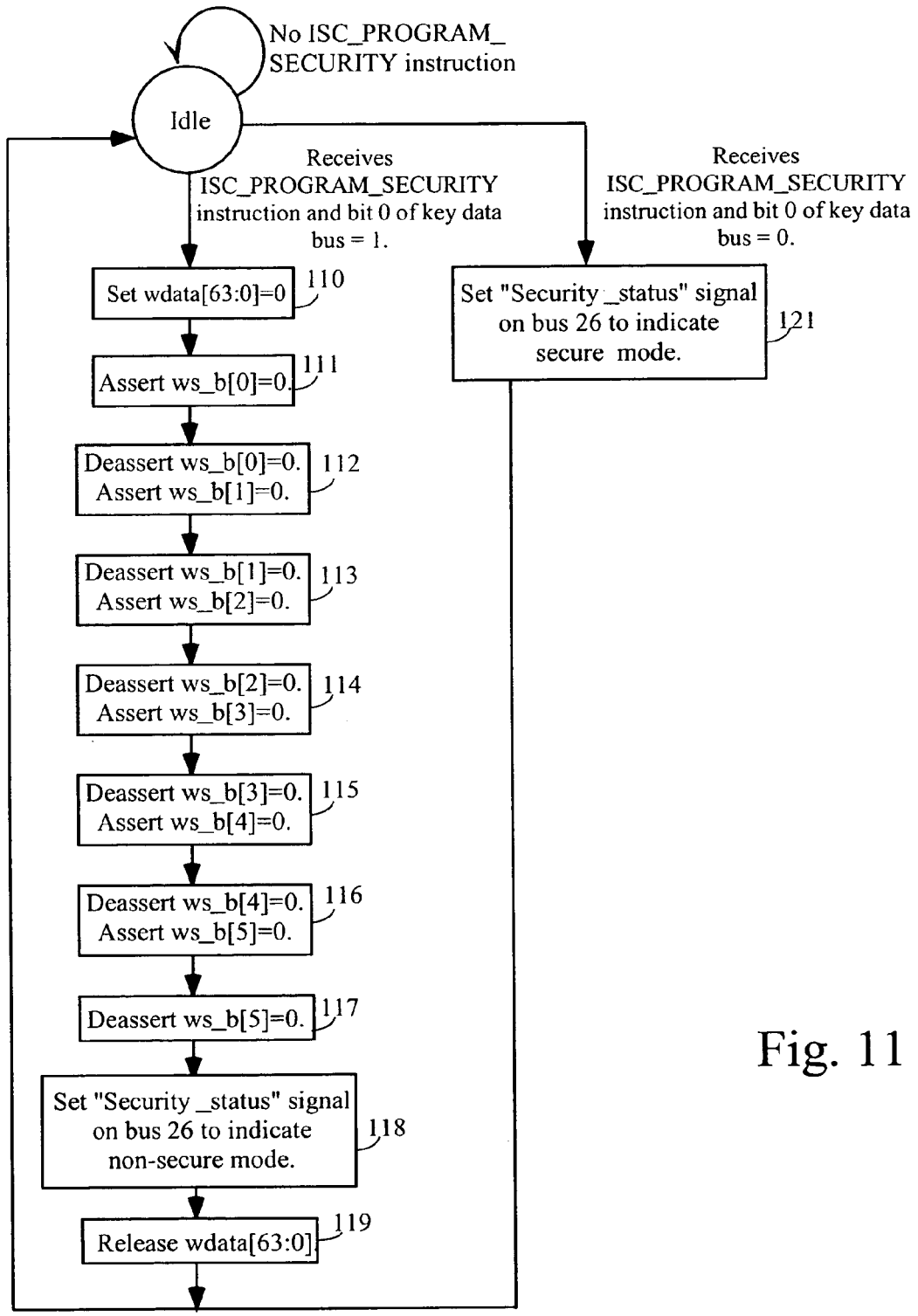
FIG. 11 shows the steps performed by control logic 23a of FIG. 10a to erase keys when made non-secure.

As shown in FIG. 11, to assure that an attacker can not return to the non-secure mode by using the ISC_PROGRAM_SECURITY instruction and then reading out the keys, if the security is eliminated (if the ISC_PROGRAM_SECURITY signal moves to the non-secure logic level), a state machine in control logic 23a erases all keys by writing zeros to all six words, one word at a time. This is done by: in step 110 putting zeros on the wdata[63:0] bus and at step 111 asserting the ws_b[0] signal (with a logic 0 value), then at steps 112–117 successively strobing the ws_b[0:0] through ws_b[5:0] signals one at a time before changing the security status at step 118 and entering the non-secure mode, and finally at step 119 releasing the wdata[63:0] logic 0 values. Thus, any attempt to place battery backed up memory 23 into a non-secure mode causes all values in key registers 23b to be erased.

To communicate whether key memory 23 is in secure mode, control logic 23a sends a secure mode signal on bus 26 (may be a single line) to configuration logic 29 to indicate that key memory 23 is operating in secure mode. If this signal switches to non-secure mode, configuration logic 29 clears the design from configuration memory 12. Note that an unencrypted bitstream may be loaded by configuration logic 29 into configuration memory 12 even though keys are stored in key registers 23b and key memory 23 is in a secure mode.

Loading the Keys, Multiple Encryption Keys

Decryption keys must be loaded into the PLD before the PLD is put into a secure mode where a user can not learn details of the design. In the embodiment shown in FIG. 3, the key or keys are loaded through a JTAG port 20.

As a feature of the invention, the encryption keys are loaded through this JTAG port 20. It is expected that JTAG programmers will load the encryption keys during board testing. When the RAM for storing keys is in a non-secure mode, the user has full access to it and can read out both the keys and the design, even if the design has been encrypted. This is useful for the designer while testing the keys and the use of the keys. Then once the designer is satisfied with the operation, he or she can send another instruction through the JTAG port and place the key memory into a secure mode. Once the key memory has been placed into secure mode, the keys can not be read out. Further, moving the key memory from secure to non-secure mode erases the keys by activating a circuit that starts up the memory initialization process. (FIG. 15, discussed below, shows a state machine for performing this function.)

According to one aspect of the invention, more than one key may be used to encrypt the design. For example, if three keys are to be used, the bitstream is first encrypted using the first key, then the resulting encrypted bitstream is again encrypted using the second key, then finally the resulting doubly encrypted bitstream is again encrypted using the third key. This triply encrypted bitstream is stored, for example in a PROM or flash memory on the printed circuit board that holds the PLD.

For decryption, these keys are used in succession (reverse order) to repeatedly decrypt the encrypted bitstream. Further to this, if more keys are stored in the PLD than are used for decrypting a particular design, the encrypted bitstream may include in an unencrypted portion an indication of how many keys are to be used, and the address of the first key. Such an embodiment may make it easier for an attacker to decrypt the bitstream because the attacker need only deal with one key at a time. Alternatively, the keys themselves may indicate whether they are the first, middle, last, or only keys. Thus the same PLD can at different times be programmed to perform different functions (configured with different designs), and information about the values of the different keys can be made available to only one or some of the designers. Thus a first designer may not learn about a second design even though both designs are implemented in the same PLD (at different times).

Regarding FIG. 3, configuration logic 29 includes additional logic beyond configuration logic 14 of FIG. 1. As in the structure of FIG. 1, the bitstream on configuration access port 21 is treated as words, in one embodiment 32-bit words. Several of the words, usually at or near the beginning of the bitstream, contain header information, for example length of the bitstream, starting address for the configuration data. New to the bitstream of the present invention is an indication as to whether the bitstream is encrypted, and the address of a key for decrypting configuration data in the bitstream.

Battery Backed up Memory

Values stored in key memory 23 are preferably retained by a battery when power to the FPGA is removed.

Further, other memories than encryption keys can also be backed up using a battery supply switch such as switch 22. In particular, a PLD can be manufactured in which the VSWITCH voltage supply is routed to all flip flops in the PLD if the purpose is to preserve data generated by the PLD when the PLD is powered down. And if the purpose is to also preserve configuration of the PLD when the PLD is powered down, configuration memory 12 (FIG. 3) may alternatively be powered from VSWITCH, though such an embodiment requires considerably more battery power than does powering just the flip flops in the PLD, and powering flip flops in turn requires more battery power than does powering a very small memory for storing a few encryption keys.

Figure 12:
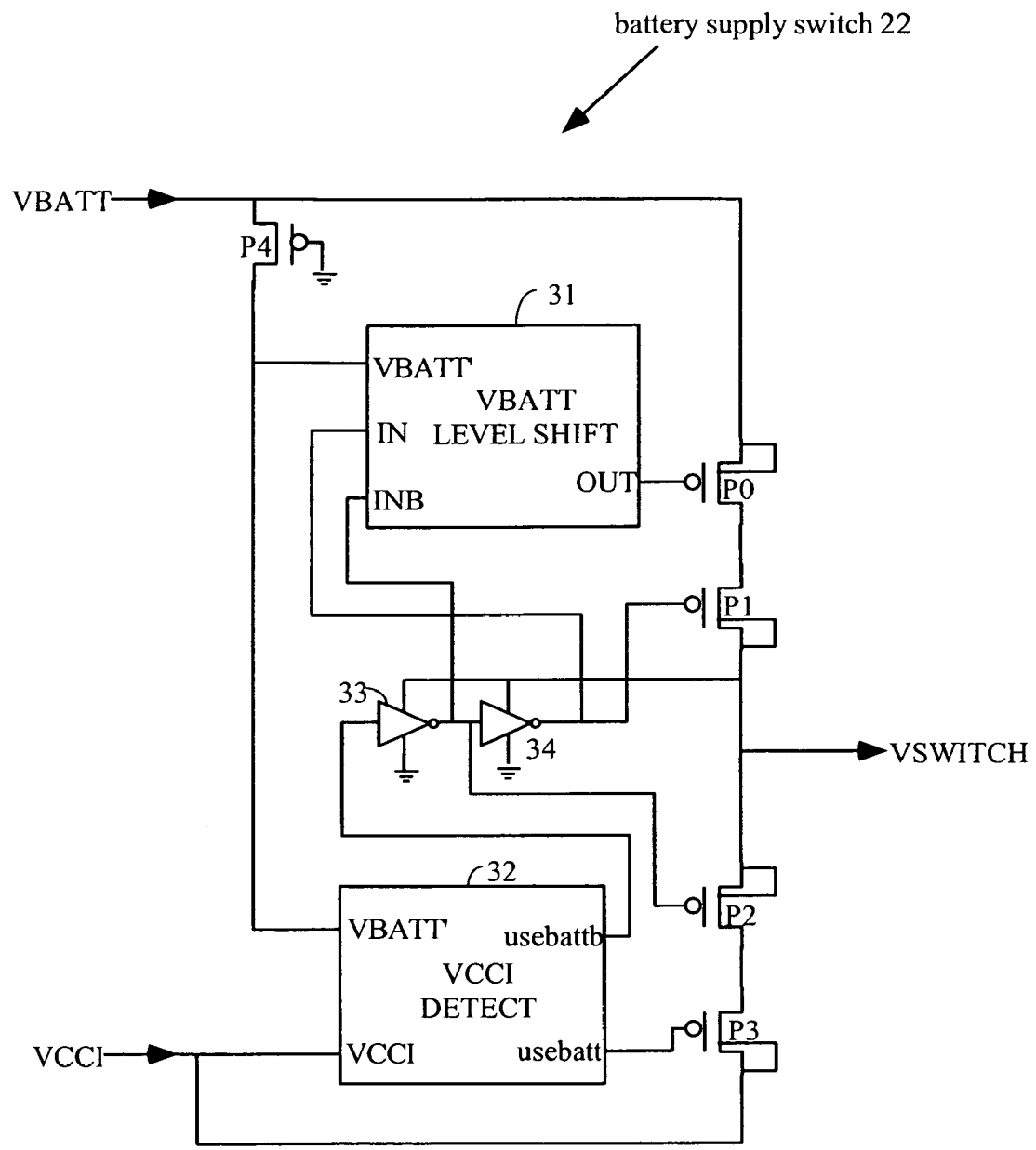

FIG. 12 shows a structure for battery supply switch 22. In this embodiment, VBATT level shift circuit 31 allows the PLD to use different voltages for the battery and main power supply. And of course the purpose of the circuit is to deal with varying voltage levels. In one embodiment, battery supply switch 22 can handle VCCI voltages up to 3.6 volts, and switches to battery power when VCCI falls below about 1 volt. Battery voltage can be between 1.0 volts and 3.6 volts.

Battery supply switch 22 includes four output driving P-channel transistors P0 through P3. Transistors P0 and P1 turn on and off together as do transistors P2 and P3. The circuit includes two transistors for each leg instead of one in order to avoid any possibility that VCCI and VBATT will be connected together. Transistor P0 includes a parasitic diode (the p-n junction between the drain and substrate) that can conduct current upward in the figure even when the transistor is off. To prevent such current flow, transistor P1 is added and has its substrate connected to its drain so that parasitic diode conduction can only be downward. A similar arrangement is made with transistors P2 and P3. Thus there is no possibility that current will conduct from VBATT to VCCI or from VCCI to VBATT. Inverters 33 and 34 are powered from the VSWITCH voltage, so they are always operational even when VCCI is off. Transistor P4 is a resistor, always on, and provides protection against electrostatic discharge. Most of the time, the structures controlled through transistor P4 do not draw current, so there is usually no voltage drop across transistor P4.

Figure 13:
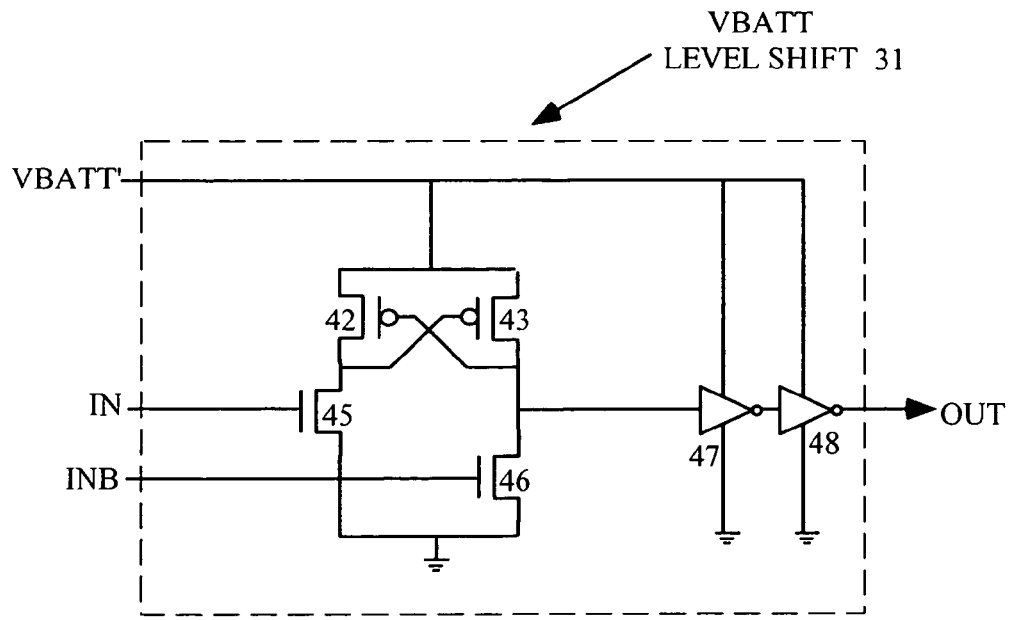
FIGS. 13 and 14 show the level shift circuit and voltage detection circuit of the battery supply switch of FIG. 12.

FIG. 13 shows one embodiment of VBATT level shift circuit 31. Output voltage at terminal OUT is controlled by signals IN and INB. These signals are generated by inverters 33 and 34, which derive their supply voltage from the VSWITCH node. Therefore, if VSWITCH is supplied by VBATT, one of signals IN and INB will be at voltage VBATT and the other will be at ground. However, if VSWITCH is supplied by VCCI, one of IN and INB will be at the VCCI voltage level. If IN is at VCCI and INB is at ground, transistor 45 will be on and transistor 46 will be off. The gate of P-channel transistor 43 will be low, and transistor 43 will be on, pulling the input of inverter 47 to VBATT. The output of transistor 48 will also be at VBATT. Returning to FIG. 12, a voltage level VBATT at the gate of transistor P0 will positively turn off transistor P0.

Figure 14:
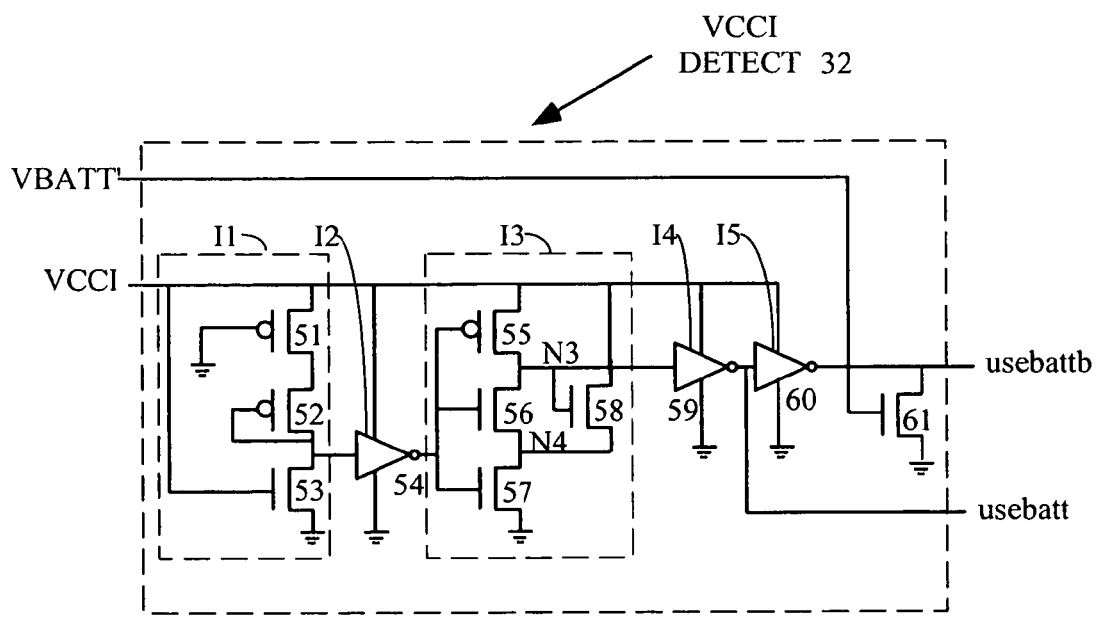

FIG. 14 shows VCCI detect circuit 32. VCCI detect circuit 32 determines when the voltage on line VSWITCH will be switched to the battery and back to VCCI. This embodiment of circuit 32 is essentially a string of five inverter stages I1 through I5. Controlling of the switching voltage occurs primarily at inverter stage I1. Transistors 52 and 53 form a CMOS inverter. Power to this CMOS inverter must flow through P-channel transistor 51, which doesn't turn on until VCCI reaches the threshold voltage of transistor 51, typically 0.7–0.8 volts. If VCCI is switching slowly, taking several milliseconds to reach full voltage, transistor 51 delays the activation of circuit I1. When transistor 51 turns on, the source (upper terminal) of transistor 52 goes to VCCI. N-channel transistor 53 typically has a threshold voltage of about 0.7–0.8 volts as well but is sized as a weak transistor relative to transistor 52. In one embodiment, transistor 53 has a width/length ratio of 1/18 whereas transistor 52 has a width/length ratio of 3/2. So transistor 53 pulls the input of inverter I2 low only until transistor 52 turns on. In one embodiment, circuit I1 pulls the input of inverter stage I2 high when VCCI is at about 1.0 volt. Thus the output of inverter 54 goes low. Inverter stage I3 is a Schmitt trigger. The zero volt input to inverter stage I3 turns off transistors 56 and 57 and turns on transistor 55, pulling node N3 to VCCI and turning on transistor 58, which pulls up node N4, thus raising the voltage at which transistor 56 will turn on, and preventing small variations in VCCI from switching the voltage at node N3. Inverters 59 and 60 are optional and produce a sharper edge of the output signals usebatt and usebattb that cause battery supply switch 22 of FIG. 12 to switch from VBATT to VCCI. Transistor 61, controlled by the VBATT signal, is a weak pull-down transistor and assures that the usebattb line is pulled low when VCCI is not present and therefore not providing an output signal from inverter 60.

Key Not Available to Purchaser of a Product Containing the Configured PLD

In order to prevent an attacker from learning the design that has been used to configure the PLD, several additional steps may be taken.

According to another aspect, a key is loaded into the PLD before sale of a system incorporating the PLD, such that after sale of a system including the PLD, the design can be loaded into the PLD and used, but an attacker can not learn the value stored in the key (or keys). Thus the unencrypted design can not be read or copied. To achieve this security, several steps are taken.

Secure Mode Preservation (Tamper-Proofing)

In one embodiment, there are two security flags in configuration logic 29 of the PLD. One indicates whether the decryption keys are secured, and the other indicates whether the design is a decrypted design and must be protected. If JTAG logic 13 (FIG. 3) selects secure mode with the ISC_PROGRAM_SECURITY instruction, a secure_key flag in control logic 23a (FIG. 10a) is set. If the bitstream loaded into the PLD has the indication that design data in the bitstream is encrypted, a secure_design flag in configuration logic 29 (not shown) is set. If either flag is later unset, the entire configuration memory is cleared, thereby removing the decrypted design. If the secure_key flag is reset (by an ISC_PROGRAM_SECURITY instruction), then the keys are also erased.

Figure 15:
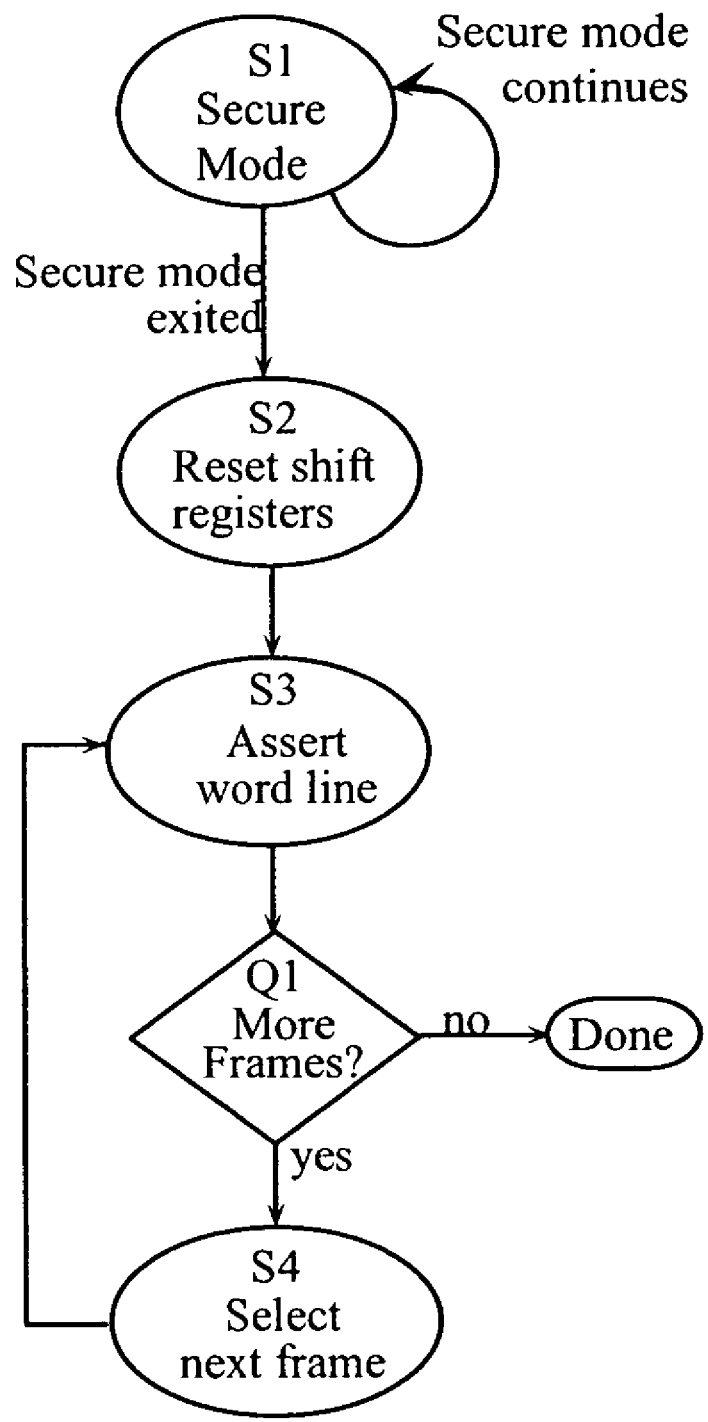
FIG. 15 shows a state machine for erasing a design when a secure mode is exited.

FIG. 15 shows a state machine for performing the design clearing function. When the secure_design flag is set, the state machine enters state S1. This state monitors a change from secure to non-secure mode of the secure_design flag. As long as the secure-design mode continues, the state machine stays in state S1. Once a change occurs, the state machine enters state S2 and the data shift registers for shifting data into configuration memory 12 are reset, thereby placing zeroes on all data lines for the configuration memory bits. Next, the state machine moves to state S3 where the word line of the addressed frame is asserted. This results in the zeros on the data shift register lines being written into the memory bits at the addressed frame. If question Q1 indicates there are more frames to be addressed, the state machine moves to state S4 where the frame address is advanced and the state machine returns to state S3. When question Q1 indicates there are no more frames to be addressed, the process is done and the configuration memory is cleared.

It is also necessary to protect the keys from being accessed by an attacker. Loading of the keys is performed before a system containing the design is made available to an end customer. When designers are in the process of developing the design, they may wish to operate the PLD in a non-secure mode for debugging. In order to allow for this debugging operation and also to preserve security of the keys, the key loading process begins in a non-secure mode by clearing all key registers. A secure key flag must be kept in the non-secure mode while keys are loaded and while the keys are read back for verification. The secure key flag may also be kept in the non-secure mode while a configuration bitstream is loaded and decrypted. But once the secure key flag is set, returning the secure key flag to the non-secure mode clears all keys and also initiates operation of the state machine of FIG. 15. So, not only are the keys cleared, but the configuration is also cleared.

Readback Attack and Readback Disabled

Some FPGAs allow a bitstream to be read back out of the FPGA so that a user may debug a design or may obtain state machine information from flip flops in the FPGA. Unless the design were re-encrypted for the read-back operation, the act of reading back the bitstream would expose the unencrypted bitstream to view.

Further security of the design is provided by disabling readback when an encrypted design is loaded into the FPGA. In one embodiment, readback is disabled only if the decryption keys are also secured.

Figure 16:
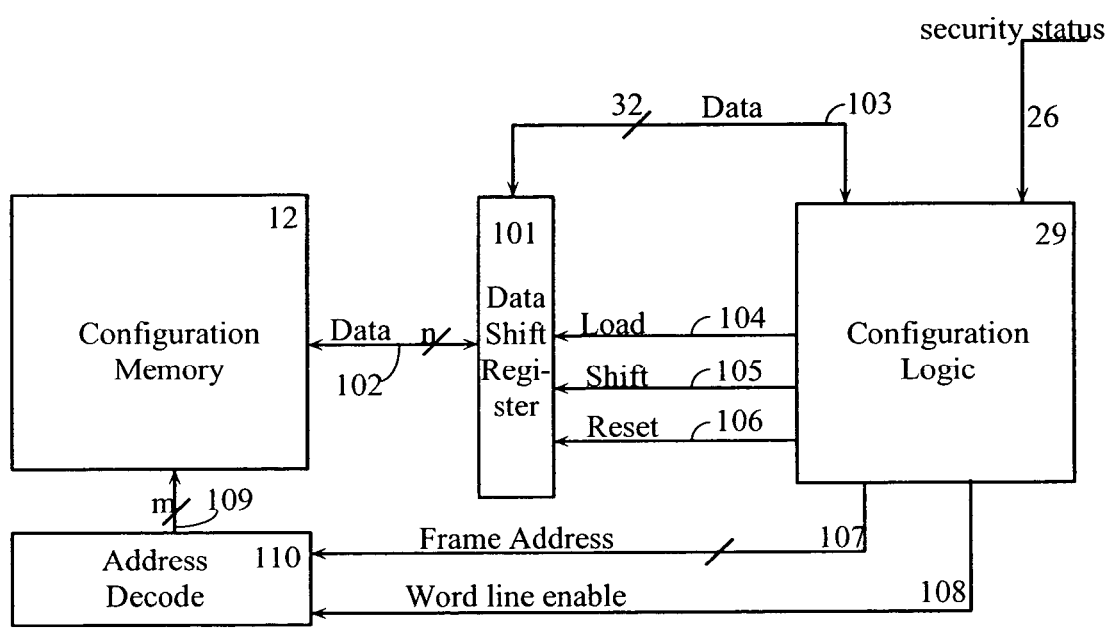
FIG. 16 shows a block diagram of elements for loading configuration memory and reading back configuration, including lines disabled when encryption is present.

FIG. 16 shows the block diagram of a structure for loading and reading back configuration memory. In one embodiment, configuration logic 29 prevents readback when two conditions are present: (1) the security status line on data bus 26 (see FIGS. 3 and 10) indicates that the keys are in a secure mode, and (2) configuration logic 29 has responded to op codes in a configuration bitstream that indicate the bitstream is encrypted. So if either the keys are not secured or the bitstream is not encrypted, readback can be enabled. In other embodiments, different conditions control whether readback can be enabled.

When configuration logic 29 receives in the bitstream a header indicating that readback is to be performed, it sends on line 107 the frame address stored in its frame address register, which is decoded by address decoder 110 to select the addressed line of bus 109. Next, word line enable signal on line 108 is asserted, which asserts the selected word line of bus 109 to allow memory cells addressed by the selected word line to place their values on the n data lines 102 (n is the frame length and is stored in configuration logic 29). Configuration logic 29 then asserts the Load signal on line 104 to load the frame of data (in parallel) into data shift register 101. Next, configuration logic 29 asserts the shift signal on line 105 to cause data shift register 101 to shift out the frame of data in 32-bit words on bus 103 to the frame data output register (see FIG. 4d) and from there to an outgoing bitstream on configuration access port 21 (FIG. 3).

If decryption is indicated in the bitstream, configuration logic 29 sets internal flags to indicate this. If these flags are set and key memory 23 is in secure mode as indicated by the security status signal on bus 26, then configuration logic 29 responds to a readback command in the bitstream by keeping the word line enable signal on line 108 inactive and by keeping the load and shift signals on lines 104 and 105 inactive to prevent readback. However, if key memory 23 is not in secure mode, even though the design may be encrypted, readback is allowed so that testing and debugging are possible.

Partial Reconfiguration Attack and Prevention

Some FPGAs allow partial reconfiguration of the FPGA or allow different parts of a design to be loaded into different parts of the FPGA using separate starting addresses and separate write instructions. An attacker might attempt to learn the design by partially reconfiguring the design to read contents of a block RAM or flip flops directly to output ports or by adding a section to an existing design to read out information that can be used to learn the design. For example, the attacker might partially reconfigure the PLD with an unencrypted design whose only purpose is to extract information about the encrypted design. Such a Trojan Horse design could be loaded into the PLD with another bitstream or attached to an existing encrypted bitstream. If the attacker was interested in learning a state machine design loaded into block RAM of an FPGA, for example, the Trojan Horse design could include logic to cycle through the addresses of the block RAM and send the block RAM data contents to package pins.

In order to prevent an attacker from making such changes, if the original design is encrypted, configuration logic 29 disallows partial reconfiguration once configuration with decryption is started. Configuration logic 29 disallows a further write instruction once a header with the decryption op code has been processed. Also, configuration logic 29 disallows configuration with decryption once configuration without encryption has been done. Configuration logic 29 accomplishes these restrictions by ignoring headers that write to configuration memory after a decrypt instruction has been received and ignoring headers that have a decrypt command if an unencrypted portion of a design has been loaded. Thus, if any op code indicates that writing with decryption is being used, the PLD will accept only a single write instruction.

ADDITIONAL EMBODIMENTS

The above description of the drawings gives detail on a few embodiments. However, many additional embodiments are also possible. For example, instead of the cipher block chaining algorithm discussed above, one can use an encryption method called cipher feedback mode in which data can be encrypted in units smaller than the block size, for example one 8-bit byte at a time. This cipher-feedback mode is described by Schneier, ibid, at pages 200–203.

In yet another embodiment, if encryption is used, all bitstreams must be loaded starting at address 0. One implementation of this embodiment replaces any address loaded into the starting frame address register FAR (FIG. 6) with address 0 when an op code specifying encryption is received.

In still another embodiment, the starting address and the design data are both encrypted. In this embodiment, it is possible to load several segments of encrypted design data starting at different frame addresses, just as is possible with unencrypted design data.

In another embodiment, the key data stored in a key memory such as key memory 23 specifies the number of keys that will follow. In a variation on this embodiment, the key data also specify the number of keys that precede the key. If an attacker gives a key address other than the first key address intended by the designer, the configuration may be aborted. Additionally, encryption will proceed until the number of keys specified within the keys have been used.

In another embodiment, instead of allowing keys to be read back when the key memory is in a non-secure mode, the keys include parity bits or CRC check bits, and only these bits can be read back for verification that the key or keys were loaded correctly. This embodiment allows keys known to one designer to be kept secret from another designer, and is useful when the PLD is to be used at different times for loading different designs.

Regarding the CRC checksum calculation discussed above, embodiments can be provided in which the CRC checksum is calculated either before or after a design is encrypted. Of course, if the checksum added to the bitstream is calculated before the design data is encrypted, then a corresponding checksum must be calculated within the PLD on the design data after it has been decrypted. Likewise, if the checksum added to the bitstream is calculated after the design data has been encrypted, then the PLD must calculate the corresponding checksum on the received bitstream before the design data have been decrypted.

A further note regarding the process of loading the decryption keys, when the process illustrated in FIG. 8 is used, it is not necessary to use a device programmer for loading decryption keys. The keys may simply be loaded as part of the board test procedure.

It is also possible to use the structures and methods described above for programming more than one PLD. It is well known to use a single bitstream for programming more than one PLD or FPGA, either by arranging several devices in a daisy chain and passing the bitstream through the devices in series or addressing the devices in series. It is possible to arrange several PLDs in such an arrangement when one or more of the devices is to receive encrypted design data.

As yet another embodiment, although one embodiment was described in which only a single address could be specified for a bitstream having encrypted design data, in another embodiment, several addresses, preferably encrypted, can be specified for loading separate portions of a design. Further, these separate portions may use the same encryption key or keys, or the separate portions may use different encryption keys or different sets of keys.

Variations that have become obvious from the above description are intended to be included in the scope of the invention.

What is claimed is:

1. A programmable logic device (PLD) comprising:
configurable logic configured by a configuration memory;
structure for receiving a bitstream from a source external to the PLD, wherein the bitstream includes unencrypted configuration bits and encrypted configuration bits;
a key memory for storing a decryption key;
a decryptor having a decryption algorithm for decrypting the encrypted configuration bits in the bitstream using the key, and thereby forming configuration data; and
structure for loading the configuration data into the configuration memory.

2. The PLD of claim 1 further comprising structure for placing the key memory into a secure mode and a non-secure mode, and wherein keys are loaded while the key memory is in the non-secure mode.

3. The PLD of claim 2 wherein the keys can be read while the key memory is in the non-secure mode.

4. The PLD of claim 3 wherein moving the key memory from the secure mode to the non-secure mode causes all keys to be erased.

5. The PLD of claim 4 wherein moving the key memory from the secure mode to the non-secure mode also causes the configuration data to be erased.

6. The PLD of claim 1 wherein the bitstream comprises a plurality of words of data, and the decryption algorithm uses both the key and a previously decrypted word of the configuration data for decrypting a current word of the encrypted configuration bits.

7. The PLD of claim 1 wherein the unencrypted configuration bits are control bits and the encrypted configuration bits are configuration data bits.

8. A programmable logic device (PLD) comprising:
configurable logic configured by a configuration memory;
structure for receiving a bitstream from a source external to the PLD;
a key memory for storing a decryption key;
a decryptor having a decryption algorithm for decrypting data in the bitstream using the key;
structure for loading the decrypted data into the configuration memory;
structure for reading header information from the bitstream indicating whether the bitstream includes encrypted data; and
structure for directing the bitstream to the decryptor if the header information indicates the bitstream includes encrypted data and bypassing the decryptor if the header information indicates the bitstream does not include encrypted data.

9. The PLD of claim 8 further comprising:
structure for reading back configuration from the configuration memory; and
structure for disabling the structure for reading back configuration when the header information indicates the bitstream includes encrypted data.

10. The PLD of claim 8 further comprising:
structure for reconfiguring the PLD after the PLD has been configured; and
structure for disabling the structure for reconfiguring the PLD when the header information indicates the bitstream includes encrypted data.

11. A programmable logic device (PLD) comprising:
configurable logic configured by a configuration memory;
structure for receiving a bitstream from a source external to the PLD;
a key memory for storing a plurality of decryption keys, wherein the key memory includes a plurality of registers for storing the plurality of decryption keys;
a decryptor having a decryption algorithm for decrypting data in the bitstream using at least one of the keys; and
structure for loading the decrypted data into the configuration memory.

12. The PLD of claim 11 wherein the decryptor reads from one of the registers for storing a plurality of decryption keys a value indicating whether another key will also be used for decryption.

13. The PLD of claim 11 wherein the decryptor includes a circuit for aborting decryption if an attempt is made to use the keys differently from the way specified by the keys.

14. The PLD of claim 11 wherein a key specifies whether it is a first, middle, last, or only key of a key set.

15. The PLD of claim 11 wherein a key specifies whether it is a last key or not a last key of a key set.

16. The PLD of claim 11 wherein the PLD reads an address of a key from the bitstream.

17. The PLD of claim 11 wherein a first group of words in the bitstream is encrypted with a first key known to a first designer and a second group of words in the bitstream is encrypted with a second key known to a second designer.

18. A programmable logic device (PLD) comprising:
configurable logic configured by a configuration memory;
structure for receiving a bitstream from a source external to the PLD;
a key memory for storing a decryption key;
a decryptor having a decryption algorithm for decrypting encrypted configuration bits in the bitstream using the key, and thereby forming configuration data; and
structure for loading the configuration data into the configuration memory.

19. The PLD of claim 18 wherein the structure for loading the configuration data into the configuration memory includes a CRC checksum calculation circuit.

20. A programmable logic device (PLD), comprising:
a configuration memory;
programmable logic circuitry coupled to the configuration memory;
a decryptor circuit coupled to the configuration control circuit and adapted to decrypt input data and output decrypted data; and
a configuration control circuit coupled to the configuration memory, to the decryptor circuit, and to a configuration input port, the configuration control circuit adapted to receive configuration data via the input port, transmit an first portion of the configuration data to the decryptor circuit responsive to a code in a second portion of the configuration data having a first value, and load the configuration memory with decrypted data from the decryptor circuit.

21. The PLD of claim 20 further comprising a key storage element coupled to the decryptor circuit and adapted for storage of at least one decryption key.

22. The PLD of claim 20, wherein the configuration control circuit is further adapted to bypass transmission of the first portion of the configuration data to the decryptor circuit responsive to the code having a second value.

23. The PLD of claim 20, wherein the configuration control circuit is further adapted to disable partial reconfiguration of the PLD and disable readback of configuration data from the PLD responsive to input of encrypted configuration data, decryption of the encrypted configuration data, and loading of the configuration memory.

24. The PLD of claim 20, further comprising a key storage element coupled to the decryptor circuit and adapted to store plurality of decryption keys.

25. The PLD of claim 24, wherein the decryptor circuit is adapted to decrypt a single input set of encrypted data using the plurality of encryption keys.

26. The PLD of claim 24, further comprising a key control register coupled to the decryptor circuit, wherein the decryptor circuit is adapted decrypt a single input set of encrypted data using a number of encryption keys from the key memory responsive to a value in the key control register.

27. The PLD of claim 24, wherein the decryptor circuit is adapted to decrypt input encrypted data using one of the plurality of decryption keys addressed by a value in the second portion of the configuration data.

* * * * *